(12) United States Patent
Ishihara

(10) Patent No.: US 8,908,589 B2
(45) Date of Patent: Dec. 9, 2014

(54) REPEATER DEVICE

(75) Inventor: Takeshi Ishihara, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/419,803

(22) Filed: Mar. 14, 2012

(65) Prior Publication Data

US 2012/0230246 A1  Sep. 13, 2012

Related U.S. Application Data

(63) Continuation of application No. PCT/JP2010/001025, filed on Feb. 18, 2010.

(51) Int. Cl.
*H04B 7/14* (2006.01)
*G06F 1/32* (2006.01)
*H04L 12/12* (2006.01)
*H04L 12/40* (2006.01)

(52) U.S. Cl.
CPC ............. *G06F 1/3209* (2013.01); *Y02B 60/34* (2013.01); *H04L 12/12* (2013.01); *H04L 12/40039* (2013.01)
USPC ........................................... 370/315

(58) Field of Classification Search
None
See application file for complete search history.

(56) References Cited

U.S. PATENT DOCUMENTS

| 2005/0047356 | A1 | 3/2005 | Fujii et al. | |
| 2007/0206500 | A1* | 9/2007 | Mollah et al. | 370/235 |
| 2007/0206628 | A1* | 9/2007 | Nishio et al. | 370/445 |

FOREIGN PATENT DOCUMENTS

| JP | 2005-018377 | 1/2005 |
| JP | 2007-081519 | 3/2007 |
| JP | 2007-243238 | 9/2007 |

OTHER PUBLICATIONS

English-language translation of International Preliminary Report on Patentability for PCT/JP2010/001025.
Search Report for PCT/JP2010/001025 mailed May 25, 2010.
Office Action dated Feb. 18, 2014 in counterpart Japanese Patent Application No. 2012-500384 and English-language translation thereof.

* cited by examiner

*Primary Examiner* — Alvin Zhu
(74) *Attorney, Agent, or Firm* — Nixon & Vanderhye, P.C.

(57) ABSTRACT

A repeater device that achieves remote activation without fail by increasing the probability of an activation instruction frame reaching a to-be-activated communication device. The repeater device includes an activation signal generation unit that generates an activation signal, which activates a first communication device, when a frame, which is to be transmitted to the first communication device that is one of communication devices connected to a network managed by the repeater device, is received and when the first communication device is not in operation; and an annunciation signal generation unit that generates an annunciation signal, which sets up a non-communication section in which no communication takes place for a certain period of time with a communication device connected to the network. The repeater device sets up a non-communication section using an annunciation signal, and transmits, with the non-communication section set up, an activation signal.

4 Claims, 30 Drawing Sheets

FIG.5

| ID (501) | 802.11 Related information (502) | Operating state (503) | Remote activation method (504) | |
|---|---|---|---|---|
| ID1 | DATA1 | Activation process in progress | Method 1 | 511 |
| ID2 | DATA2 | Out of service | Method 2 | 512 |
| ID3 | DATA3 | Operation in progress | — | 513 |
| ID4 | DATA4 | Operation in progress | Method 4-1 (For suspension) | 514 |
| ID4 | DATA4 | Operation in progress | Method 4-2 (For out-of-service) | 515 |
| ... | ... | ... | ... | |

FIG.6

| ID (501) | 802.11 related information (502) | Operating state (503) | Remote activation method (504) | Activation signal's transmission time (600) |
|---|---|---|---|---|
| ID1 | DATA1 | Activation process in progress | Method 1 | T1 |
| ID2 | DATA2 | Out of ervice | Method 2 | T2 |
| ID3 | DATA3 | Operation in progress | — | — |
| ... | ... | ... | ... | ... |

| ID 501 | 802.11 related information 502 | Operating state 503 | Remote activation method 504 | Activation signal frame 700 |
|---|---|---|---|---|
| ID1 | DATA1 | Activation process in progress | Method 1 | F1 — 701 |
| ID2 | DATA2 | Out of service | Method 2 | — 702 |
| ID3 | DATA3 | Operation in progress | — | — 703 |
| ID4 | DATA4 | Operation in progress | Method 4-1 (For suspension) | F4-1 (For suspension) 704 |
| ID4 | DATA4 | Operation in progress | Method 4-2 (For out-of-service) | F4-2 (For out-of-service) 705 |
| ... | ... | ... | ... | ... |

FIG.10

| ID 701 | 802.11 related information 702 | Operating state 703 | Remote activation method 704 | Measures during activation process 2000 |
|---|---|---|---|---|
| ID1 | DATA1 | Activation process in progress | Method 1 | Measure 1 |
| ID2 | DATA2 | Out of service | Method 2 | Measure 2 |
| ID3 | DATA3 | Operation in progress | — | — |
| ID4 | DATA4 | Operation in progress | Method 4-1 (For suspension) | Measure 4-1 (For suspension) |
| ID4 | DATA4 | Operation in progress | Method 4-2 (For out-of-service) | Measure 4-2 (For out-of-service) |
| ... | ... | ... | ... | ... |

Column refs: 2001, 2002, 2003, 2004, 2005

| ID | 802.11 related information | Operating state | Activation method | Number of times activation is tried | Number of times confirmation is tried | Period of time until activation confirmation |
|---|---|---|---|---|---|---|
| ID1 | DATA1 | Operation in progress | Method 1 | V11 | V12 | V13 |
| ID2 | DATA2 | Out of service | Method 2 | V21 | V22 | V23 |
| ID3 | DATA3 | Operation in progress | — | — | — | — |
| ID4 | DATA4 | Operation in progress | Method 4-1 (For suspension) | V41-1 | V42-1 | V43-1 |
| ID4 | DATA4 | Operation in progress | Method 4-2 (For suspension) | V41-2 | V42-2 | V43-3 |
| ... | ... | ... | ... | ... | ... | ... |

| Src MAC | Dst MAC | Src IP | Dst IP | Protocol | Src Port | Dst Port | Priority information |
|---|---|---|---|---|---|---|---|
| MAC1 | MAC2 | IP1 | IP2 | Proto1 | Port1 | Port2 | High |
| MAC1 | MAC3 | IP1 | IP3 | Proto2 | Port3 | Port4 | Low |
| MAC2 | MAC1 | IP2 | IP1 | Proto1 | Port2 | Port1 | High |
| ... | ... | ... | ... | ... | ... | ... | ... |

| ID | 802.11 related information | Operating state | Remote activation method | Priority information |
|---|---|---|---|---|
| ID1 | DATA1 | Activation process in progress | Method 1 | High |
| ID2 | DATA2 | Out of service | Method 2 | Medium |
| ID3 | DATA3 | Operation in progress | — | Low |
| ... | ... | ... | ... | ... |

FIG. 18
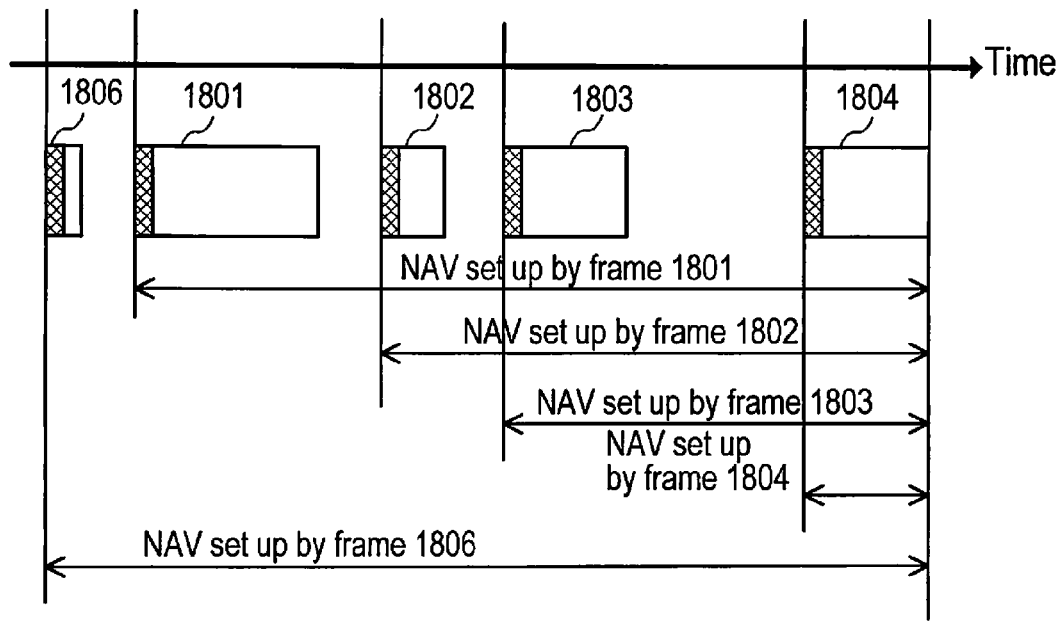
(a) Example of case where a group of a plurality of signals is regarded as activation signal
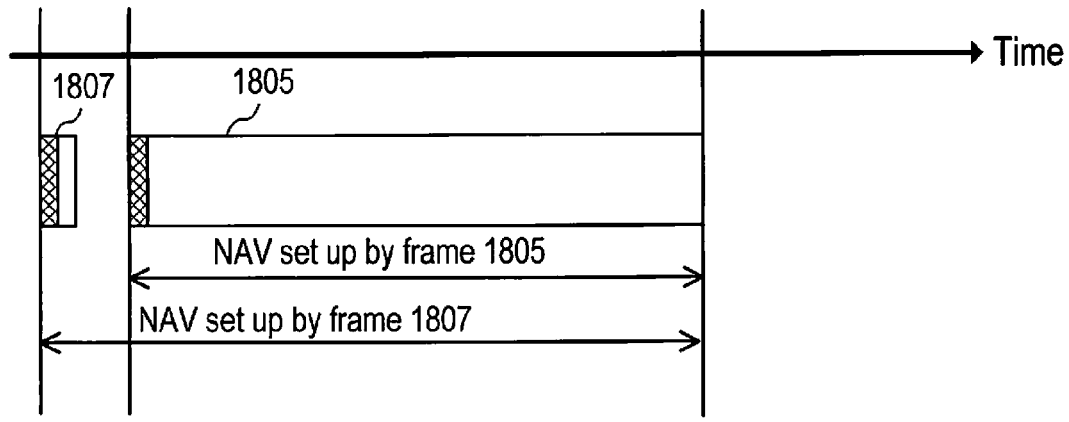
(b) Example of case where activation signal is created by one signal

US 8,908,589 B2

REPEATER DEVICE

CROSS-REFERENCE TO RELATED APPLICATION

This application is a continuation of International Application No. PCT/JP2010/001025 filed on Feb. 18, 2010, the entire contents of which are incorporated herein by reference.

FIELD

Embodiments described herein relate generally to a repeater device equipped with a remote activation technology.

BACKGROUND

As for a remote activation technology, what is known is a remote activation technology that makes use of a broadcast or multicast frame associated with an IEEE802.11-compliant wireless LAN terminal.

According to the above technique, after an access point transmits a frame to order activation, a wireless LAN terminal receives the frame and turns on the power of the wireless LAN terminal itself. In this manner, the remote activation is realized.

In a situation where wireless LAN connection is unstable, the activation-ordering frame can be lost in a wireless section between the access point and the wireless LAN terminal.

However, the technique of PTL 1 is not prepared for a loss of frames that serve as such activation signals. As a result, the activation-ordering frame may not arrive at the wireless LAN terminal, possibly resulting in a remote activation failure.

BRIEF DESCRIPTION OF THE DRAWINGS

FIG. 5 is a table showing one embodiment of information managed in a storage unit of the repeater device.

FIG. 6 is a table showing one embodiment of information managed in the storage unit of the repeater device.

FIG. 7 is a table showing one embodiment of information managed in the storage unit of the repeater device.

FIG. 10 is a table showing one embodiment of information stored in the storage unit of the repeater device.

FIG. 14 is a table showing one embodiment of information managed in a storage unit of the repeater device of second embodiment.

FIG. 16 is a table showing one embodiment of the case where priority information is stored independently in a storage unit.

FIG. 17 is a table showing one embodiment of the case where priority information, as well as connection management information, is stored in the storage unit.

FIG. 18 is a diagram showing one embodiment of activation signals that have been turned into NAVs.

DETAILED DESCRIPTION

According to one embodiment, a repeater device includes: an interface that connects to a network, receives a data frame, transmits an activation signal frame, and transmits an annunciation signal frame; an activation signal generation unit that generates an activation signal frame, which activates a first communication device, when a data frame, which is to be transmitted to the first communication device connected to the network, is received and when the first communication device is not in operation; and an annunciation signal generation unit that generates an annunciation signal frame, which sets up a non-communication section in which no frame is transmitted for a certain period of time to a communication device connected to the network, wherein the annunciation signal frame is transmitted to a communication device connected to the network via the interface, and, with the non-communication section set up, the activation signal frame is transmitted to the first communication device.

Hereinafter, the present embodiments will be described with reference to the accompanying drawings. In each diagram, the same parts are denoted by the same reference symbols, and repeated explanation will be omitted.

[First Embodiment]

Figure 1:
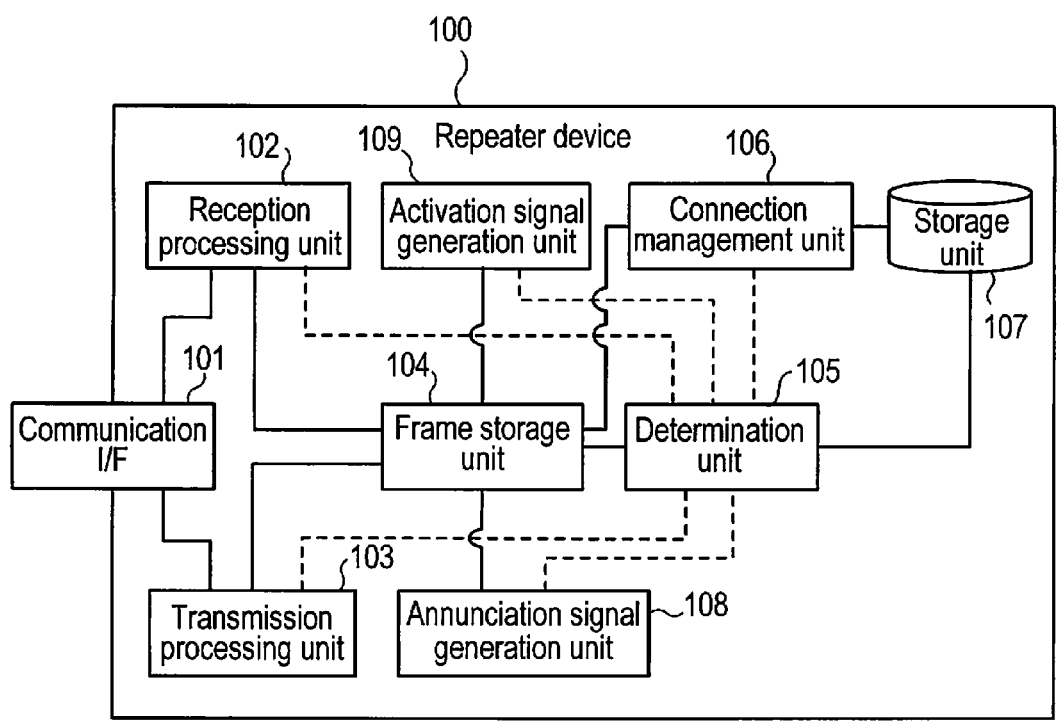
FIG. 1 is a block diagram showing the configuration of a repeater device according to first embodiment.

FIG. 1 is a block diagram showing the configuration of a repeater device 100 according to first embodiment. In a wireless LAN environment of an infrastructure mode, the exchange of signals or data between communication devices, such as wireless terminals, is performed always via a repeater device. The repeater device 100 of the present embodiment is a repeater device for wireless communication.

The repeater device 100 includes a communication I/F 101, a reception processing unit 102, a transmission processing unit 103, a frame storage unit 104, a determination unit 105, a connection management unit 106, a storage unit 107, an annunciation signal generation unit 108, and an activation signal generation unit 109.

The communication I/F 101 is an interface to be connected to an external network (which means, hereinafter, a network under the control of the repeater device 100 unless otherwise stated) under the control of the repeater device 100. More specifically, the communication I/F 101 includes a function of converting control frames, management frames, data frames and other frames, which are received as radio signals via the network, into digital signals and transferring the digital signals to the reception processing unit 102. The communication I/F 101 also includes a function of converting new frames transferred from the transmission processing unit 103 from digital signals to radio signals and transmitting the radio signals to the network. The new frames transferred from the transmission processing unit 103 are, for example, activation signal frames and annunciation signal frames. The activation signal frames and the annunciation signal frames will be described later.

In FIG. 1, only one communication I/F 101 is shown. However, there may be a plurality of communication I/Fs. As for the type of a network to which the communication I/F 101 is connected, for example, a network that complies with IEEE802.11 and an accompanying wireless LAN standard thereof is suitable. In first embodiment, the repeater device, the network and the like are compliant with the IEEE802.11 wireless LAN standard.

Incidentally, the type of the network is not limited to those for wireless LAN standard. For example, the type of the network may be any wireless communication standard other than wireless LAN, such as Bluetooth (Registered Trademark) or infrared; IEEE802.3 and an accompanying wired LAN standard thereof; PLC (Power Line Communication); or any other wire communication standard.

The reception processing unit 102 processes a frame received by the communication I/F 101. For example, the way a frame is processed is a process of checking frame check sequences, which exist in the header and final section of IEEE802.11 at the beginning of the received frame, and confirming whether the received frame is a normal frame compliant with the IEEE802.11 standard.

The frame that has been confirmed as a normal frame is stored in the frame storage unit 104. Furthermore, the reception processing unit 102 instructs the determination unit 105 to determine how to handle the processed frame.

The determination unit 105 is instructed when the frame is stored in the frame storage unit 104, indicating that a new frame has arrived at the determination unit 105. The instructions that the determination unit 105 receives may include information used to determine a location where the new frame is stored (an address of memory or an identifier of queue, for example).

Based on instructions of the determination unit 105, the transmission processing unit 103 processes the frame stored in the frame storage unit 104 in such a way that the frame can be transmitted to the network via the communication I/F 101. For example, the above process is a process of adding a header and frame check sequence, which are defined in IEEE802.11, to a to-be-transmitted data frame. The instructions of the determination unit 105 may include information used to identify a location where a to-be-transmitted frame has been stored (an address of memory or an identifier of queue, for example).

A process of the communication I/F 101, part of a process of the reception processing unit 102 and part of a process of the transmission processing unit 103 are closely associated with each other. When an IEEE802.11 communication interface is used, the processes of the reception processing unit 102 and the transmission processing unit 103 need to support IEEE802.11. When being connected to a plurality of kinds of networks, the reception processing unit 102 and the transmission processing unit 103 are modified when necessary so as to support the networks.

The frame storage unit 104 is a memory that stores a frame that has undergone a reception process; a frame that will be transmitted; an annunciation signal that is transmitted regularly to the network; and an activation signal frame that is used to instruct a communication device to be remotely activated.

The determination unit 105 determines, based on a frame that has undergone a reception process and been stored in the frame storage unit 104, a necessary process for the frame; and issues instructions to each of components that make up the repeater device 100. The following processes are among those determined by the determination unit 105.

Process 1: The transmission processing unit 103 performs a predetermined process on a frame stored in the frame storage unit 104, and transfers to the network via the communication I/F 101.

Process 2: A notification is received through a frame stored in the frame storage unit 104 as to information about a communication device connected to the network, and connection management information of the communication device is updated based on the information.

Process 3: An activation signal frame is generated to activate a specific communication device connected to the network.

Process 1 is executed when a frame is relayed between a plurality of communication devices connected to the network and a communication device. An instruction for Process 1 is issued to the transmission processing unit 103.

Process 2 is a process that is executed when the state of a communication device connected to the network has changed. The case where the state changes means, for example, the case where a connection request is received from a new communication device after the communication device is connected to the network; the case where a communication device that has been connected to the network is disconnected therefrom; or the case where the operating state of a communication device that has been connected to the network has changed. An instruction for Process 2 is issued to the connection management unit 106. Incidentally, Process 2 will be described later in detail.

Process 3 is executed when the communication of a frame is relayed between communication devices in Process 1 and if it is determined that a frame-receiving-side communication device is not ready for receiving a new frame. Incidentally, whether a communication device is ready for receiving a new frame is determined based on the connection management information, which is updated by Process 2. An instruction for Process 3 is issued to the transmission processing unit 103, the annunciation signal generation unit 108 and the activation signal generation unit 109. Incidentally, Process 3 will be described later in detail.

The determination unit 105 includes a built-in timer and carries out timer management. It is possible to create a schedule therein as to when an annunciation signal frame for activation process and an activation signal frame are transmitted to a communication device. The determination unit 105 follows the schedule to regularly transmit an annunciation signal frame, as well as to transmit an activation signal frame at a predetermined timing.

The connection management unit 106 references, based on an instruction of the determination unit 105, a frame stored in the frame storage unit 104, and manages the connection state of a communication device connected to the network. Incidentally, information managed by the connection management unit 106 and the way the information is used will be described later.

The storage unit 107 is a memory in which information required for the connection management unit 106 to manage the connection state of a communication device is stored. Incidentally, information stored in the storage unit 107 will be described later in detail.

The annunciation signal generation unit 108 generates an annunciation signal frame for activation process, which is used to transmit an activation signal frame. A process of generating the activation-process annunciation signal frame is performed in response to an instruction from the determination unit 105. To the annunciation signal generation unit 108 and the network to which the communication I/F 101 is connected, a signal for notifying information about the repeater device 100 and about the network is generated at regular intervals. The signal (referred to as an annunciation signal frame, hereinafter) generated by the annunciation signal generation unit 108 is stored in the frame storage unit 104.

After receiving an instruction from the determination unit 105, the activation signal generation unit 109 generates an activation signal frame, which is used to activate a communication device connected to the network from a remote site. The generated activation signal (referred to as an activation signal frame, hereinafter) is stored in the frame storage unit 104. Instructions from the determination unit 105 include information needed to generate an activation signal frame. For example, the instructions include an identifier (e.g. MAC (Media Access Control) address or the like) used to identify a to-be-activated communication device.

(Overview of Activation Process)

Figure 2:
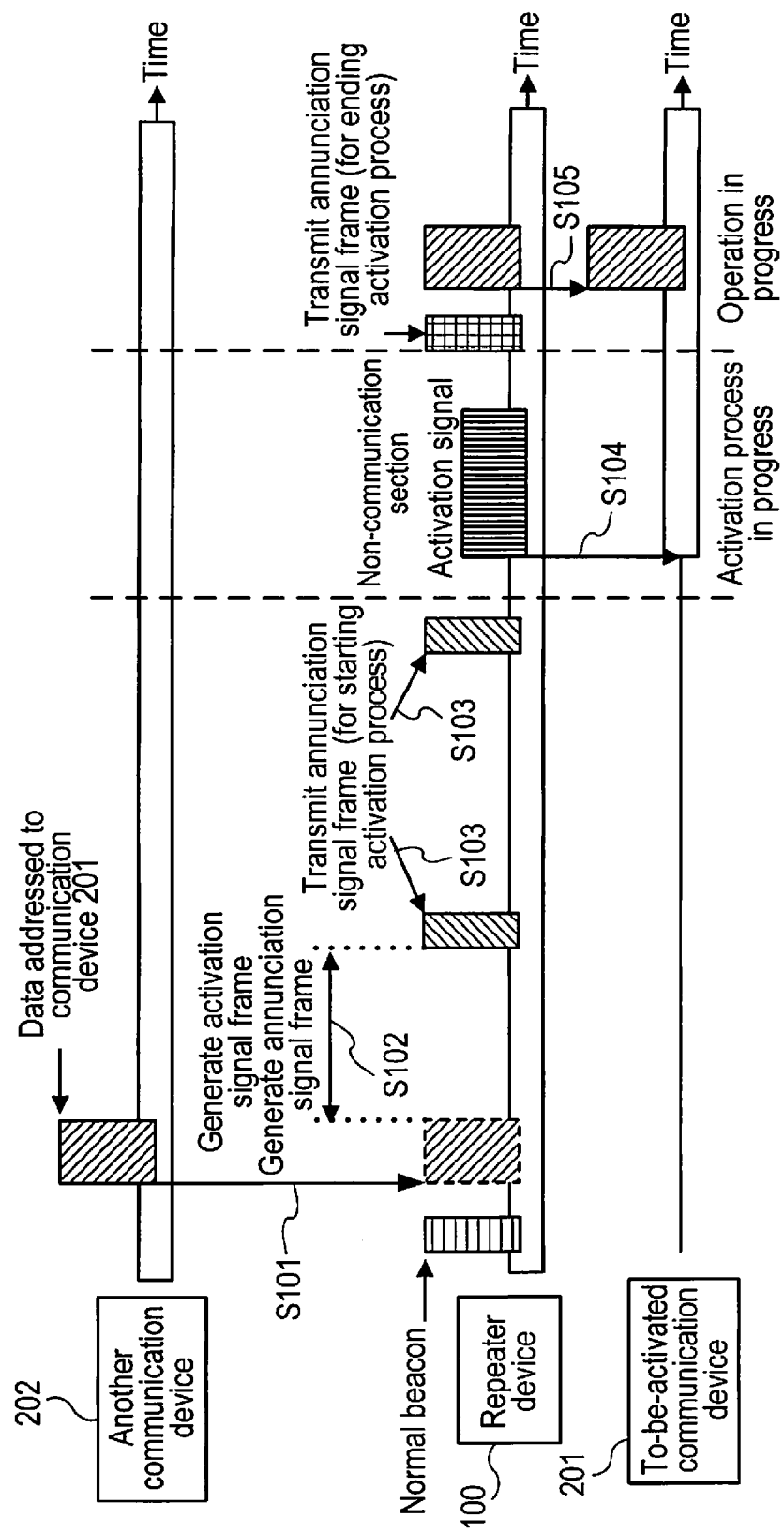
FIG. 2 is an operational schematic diagram of a wireless communication system as a whole.

The following provides an overview of how an activation processing signal is exchanged between the repeater and communication devices. FIG. 2 shows operations of the repeater device 100, a to-be-activated communication device 201, and another communication device 202 in chronological order.

The repeater device 100 regularly emits a normal beacon that is compliant with the IEEE802.11 standard. The normal beacon is a management frame not containing a QUIET element described below.

Shortly thereafter, the communication device 202 generates a data frame for the communication device 201, and transmits the data frame to the repeater device 100 (Step S101). The repeater device 100 that has received the data frame recognizes, based on management information of the communication device, that the communication device 201 is not operating. Accordingly, the repeater device 100 generates an annunciation signal frame for activation process and an activation signal frame (Step S102).

The repeater device 100 transmits the annunciation signal frame, which is used to notify the start of an activation process (Step S103). The repeater device 100 transmits the activation signal frame for a non-communication section set up by the annunciation signal frame (Step S104).

After the communication device 201 is activated, the repeater device 100 transfers a data frame, which is buffered and addressed to the communication device 201, to the communication device 201 (Step S105). The repeater device 100 performs timer management. Therefore, it is also preferred that a schedule be created as to when an annunciation signal frame for activation process and an activation signal frame are transmitted to the communication device 201. If schedule management is used, priority processing can be easily realized when a process of activating a plurality of communication devices is performed.

(Annunciation Signal for Activation Process)

Figure 3:
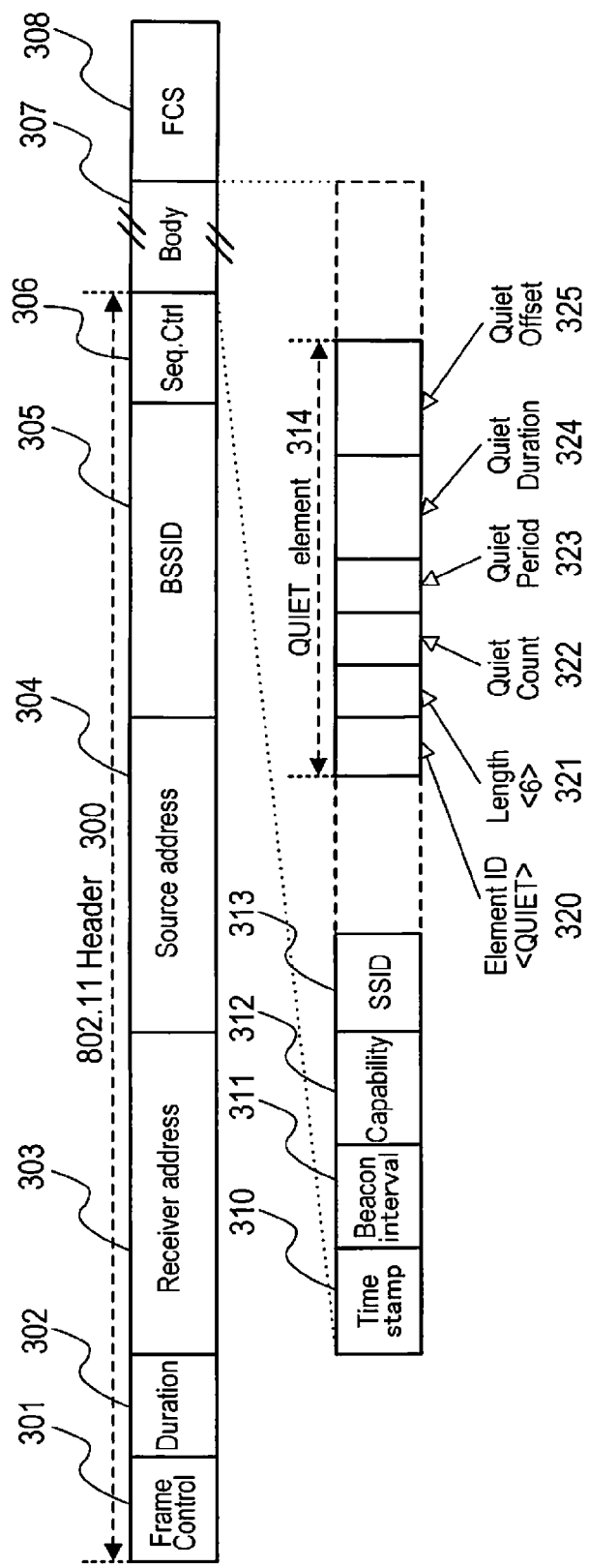
FIG. 3 is a diagram showing one embodiment of an activation-process annunciation signal that the repeater device transmits.

FIG. 3 is a diagram showing one embodiment of a frame that is used as an activation-process annunciation signal the repeater device 100 of first embodiment transmits. What is described here is the case where two annunciation signals are used as activation-process annunciation signals. Here, the case where a beacon defined by IEEE802.11 is used as an activation-process annunciation signal frame is used as an embodiment for description. The beacon is one of management frames in the IEEE802.11 wireless LAN standard, and includes a header 300, a body 307 and a frame check sequence (FCS) 308. Suppose that the header 300 and the FCS 308 follow the specifications of IEEE802.11.

The beacon uses the body 307 to transmit information required for an access point (repeater device), which transmits the beacon, to operate the network. For example, the information includes a Time stamp element 310, a Beacon interval element 311, in which beacon-transmission intervals are stored, and a SSID element 313, in which identification information of the network is stored.

As one type of information required to operate the network, a QUIET element 314 is defined in the body 307. The QUIET element 314 is used to instruct a communication device to suppress communication.

The repeater device 100 generates a beacon containing the QUIET element 314, and transmits the beacon to a communication device, thereby bringing about the situation where a running communication device does not communicate with the repeater device 100, i.e. a non-communication section. More specifically, the non-communication section is a section in which a running communication device does not transmit a frame for a certain period of time. During the non-communication section, an activation signal frame is transmitted. A communication device to which the activation signal frame is addressed is not affected by another communication device. Therefore, it is possible to realize remote activation without fail.

The QUIET element 314 includes six elements, indicated as elements 320 to 325 in FIG. 3. Each of the constituent elements plays a role in accordance with the specifications of IEEE802.11, but will be briefly described as reference.

Element ID 320 is an element in which an ID identifying the QUIET element 314 is stored. Length 321 is an element in which the length of the QUIET element 314 (except ID and Length) is stored, and a value of 6 is stored. Quiet Count 322 is an element in which a value specifying how many beacon intervals appear before the next non-communication section starts is stored. For example, if "1" is stored, a non-communication section is set up at a beacon interval started by the next beacon following the beacon containing the QUIET element 314. Quiet period 323 is an element in which the number of beacon intervals contained between regular non-communication sections defined by the present QUIET element 314 is stored. If the number is "0," no regular non-communication section is set up. Quiet Duration 324 is an element in which the length of a non-communication section is stored. Quiet Offset 325 is an offset value for a period of time from when a beacon specified in Quiet Count 322 is received to when a non-communication section starts.

Figure 4:
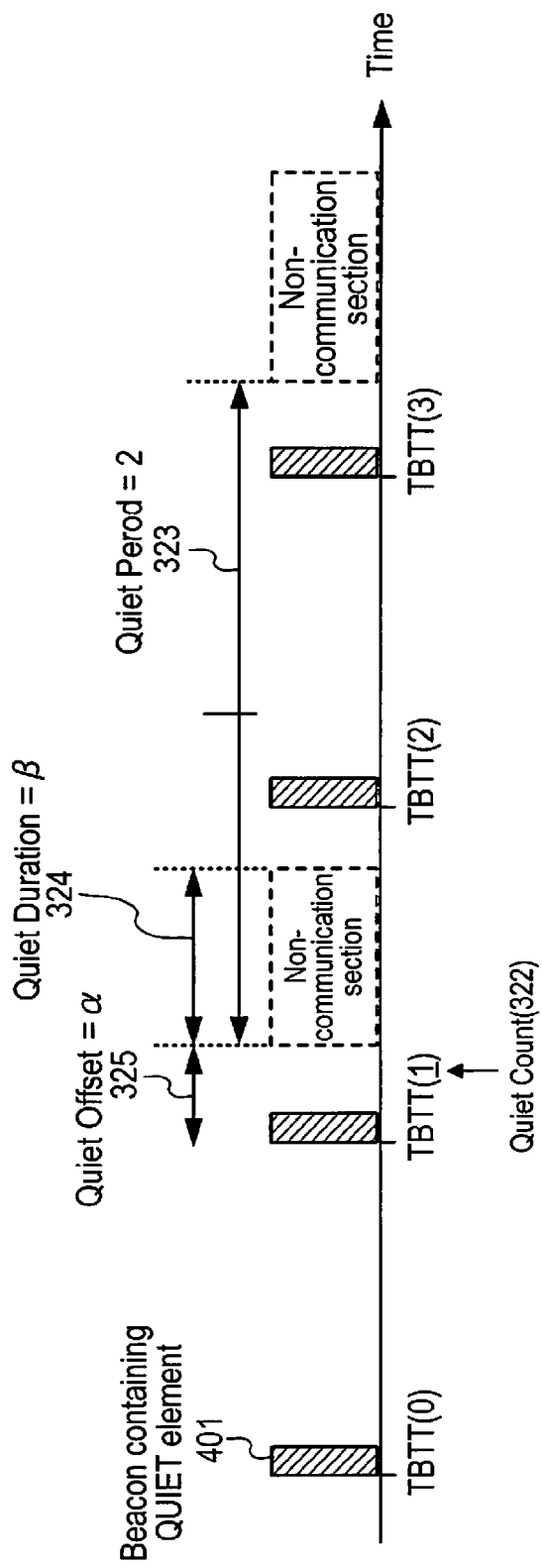
FIG. 4 is a diagram showing one embodiment of a non-communication section generated by an activation-process annunciation signal.

FIG. 4 is a diagram showing a embodiment of a non-communication section generated by an activation-process annunciation signal frame. What is shown here is the case where a beacon 401 containing a QUIET element 314 is used as an activation-process annunciation signal frame. The relationships between a series of values associated with elements 320 to 325 of the QUIET element 314 are shown in FIG. 4. In the embodiment of FIG. 4, the following are set in the beacon 401 containing the QUIET element: Quiet Count 322=1, Quiet Period 323=2, Quiet Duration 324=β, and Quiet Offset 325=α. Since a beacon that is so specified as to start a non-communication section is received, a non-communication section starts after time α has passed since the beacon is received, and the length of the non-communication section is β. It is clear that non-communication sections are so set that two beacon intervals are repeated.

In this case, the length β of the non-communication section is not the time needed to transmit an activation signal frame. It is preferred that the time to which a slight margin has been added be set. For example, it is preferred that the time be determined with a communication method of a to-be-activated communication device and the like being taken into account.

The above has described the annunciation signal frame, which is designed to start a remote activation process, and a process that is based thereon. Meanwhile, besides starting, an annunciation signal frame for ending a remote activation process can also be configured so as to use a beacon containing a QUIET element as well. In this case, however, Quiet Duration is set to zero, thereby discarding a previously set non-communication section and returning to a normal state.

If only an annunciation signal frame for starting a remote activation process is used and no ending frame is used, all that is required is to set Quiet Period to zero. As a result, a non-communication section is set up only once before a normal operation comes back.

In the above description, what is described is an embodiment in which a beacon containing a QUIET element of IEEE802.11 is used as an annunciation signal associated with a remote activation process. If a communication method is used that makes use of an annunciation signal containing an element serving as the above-described QUIET element, any other method may be used.

(Management Information)

If a frame that the repeater device 100 receives from a communication device is a frame requesting new connection or updating of connection information, the determination unit 105 instructs the connection management unit 106 to process the frame. The connection management unit 106 that has received the instruction performs a connection process in accordance with a communication method, and stores information about the communication device in the storage unit 107.

The information about the communication device managed by the repeater device 100 preferably includes an "ID for identifying a communication device," "IEEE802.11 related information," the "operating state of a communication device," and a "remote activation method of a communication device." FIG. 5 is a table showing an embodiment of entries of the information about the communication device, which are created in the storage unit 107.

The "ID for identifying a communication device" is an identifier identifying each communication device connected to the network to which the repeater device 100 is connected. For example, a MAC address is used as the ID. The "IEEE802.11 related information" is information used to manage a communication device in accordance with the above standard. The "operating state of a communication device" is the state of a communication device, and indicates "Operation in progress" when the repeater device 100 is able to communicate with the communication device. If the repeater device 100 is unable to communicate with the communication device, the operating state indicates "Out of service," which represents the situation where the communication device can quickly return in response to a signal from the outside, or "Under suspension," which represents the situation where the communication device can return in response to a signal from the outside but it takes longer time to return than to return from Out of service. When a remote activation process is being performed by the repeater device 100, the operating state is so set as to indicate "Activation process in progress." The operating state of a communication device is updated at a time when information about whether communication has succeeded with the repeater device 100 is received or when a notification of a change in the state is received from each communication device. When information indicating the fact that a communication device becomes disconnected from the network is received, then the repeater device 100 removes an entry of the communication device that has transmitted the above information from the storage unit 107.

The "remote activation method of a communication device" is information about a remote activation method that the communication device supports. In the information about remote activation method, information required for remote activation may also be stored. If there is a correlation between the operating state and the remote activation method, a plurality of entries may be formed so as to meet the above. Incidentally, if the communication device does not support remote activation, the entries are blank.

For example, a communication device of a row 511 of the entries of FIG. 5 is performing an activation process, and is a communication device that can be remotely activated by a method specified in "Method 1." A communication device of a row 512 is out of service, and is a communication device that can be remotely activated by "Method 2." A row 513 is operating, and is a communication device that does not support remote activation. As for communication devices of rows 514 and 515, the entries are for the same communication device, and are shown as a storage embodiment of a communication device whose activation method varies according to the state.

As information about a communication device, the "transmission time of an activation signal" may also be managed. If a schedule is created as to when an activation-process annunciation signal frame and an activation signal frame are transmitted to the communication device 201, the "transmission time of an activation signal" is among the necessary management information. FIG. 6 is a table showing an embodiment of information in which the "transmission time of an activation signal" is also entered.

(Operational Flow)

The following describes an operation of the repeater device 100 that is configured as described above. In the following description, two operational flows are described as operation of the repeater device 100. The first flow is an operational flow that starts at a time when a frame is received from a communication device. For example, the first flow is a flow used for a normal frame relay operation between communication devices. Moreover, when a data frame is received and when a communication device to which the data frame is addressed is not in operation, an activation-process annunciation signal frame and an activation signal frame are generated. Moreover, a schedule for transmitting the activation-process annunciation signal frame and the activation signal frame is made, and transmission is carried out. The second flow is an operational flow about timer management of the repeater device 100. For example, the second flow is an operational flow by which an annunciation signal frame is transmitted at regular intervals from the repeater device 100 to a communication device. Moreover, the timer management of the schedule determined by the above first flow for transmitting the activation-process annunciation signal frame and the activation signal frame is carried out, and the activation-process annunciation signal frame and the activation signal frame are transmitted under the timer management.

Figure 8A:
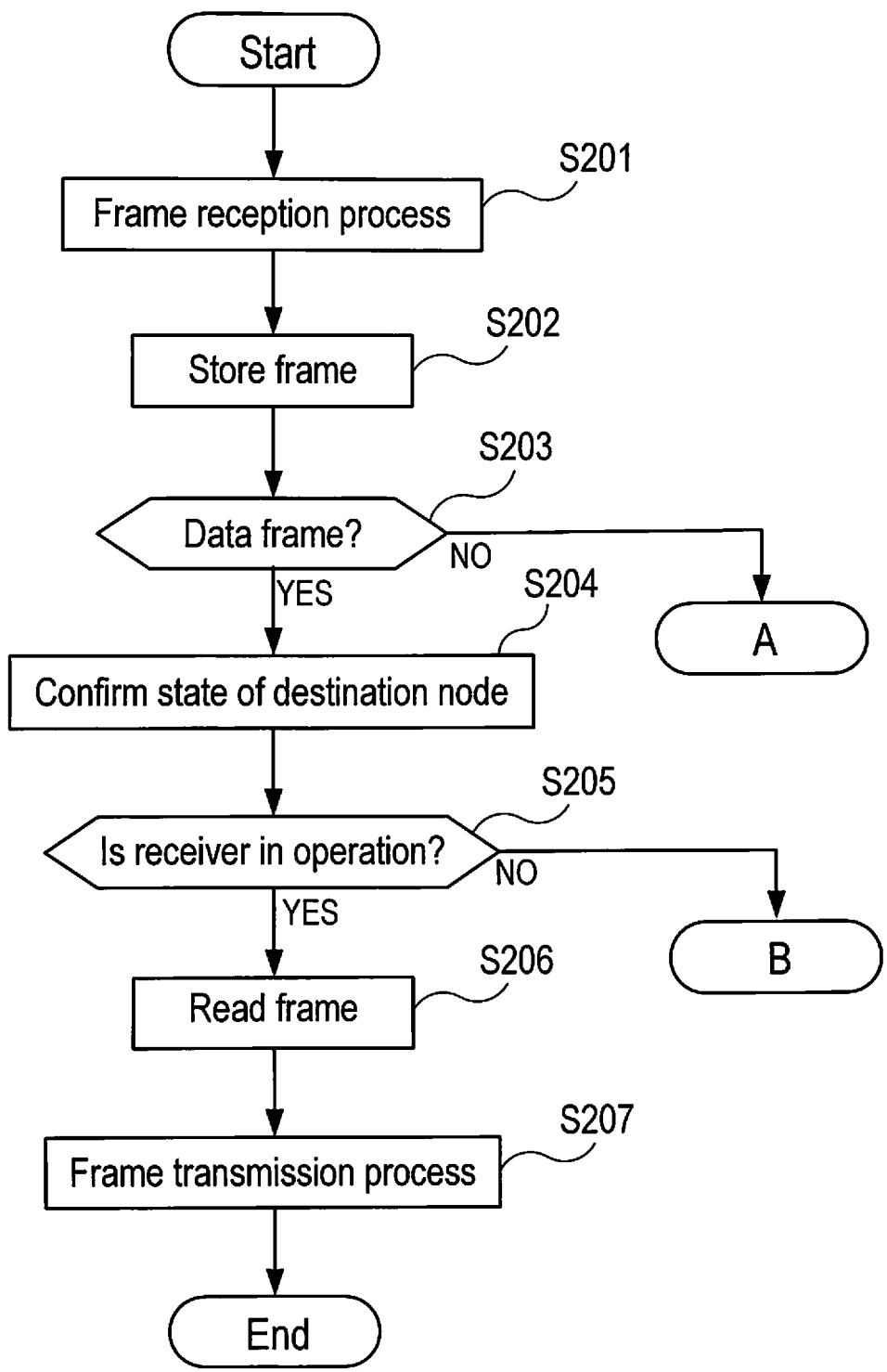
FIG. 8A is a flowchart showing a flow of operation triggered by reception of a frame in the repeater device.
Figure 8B:
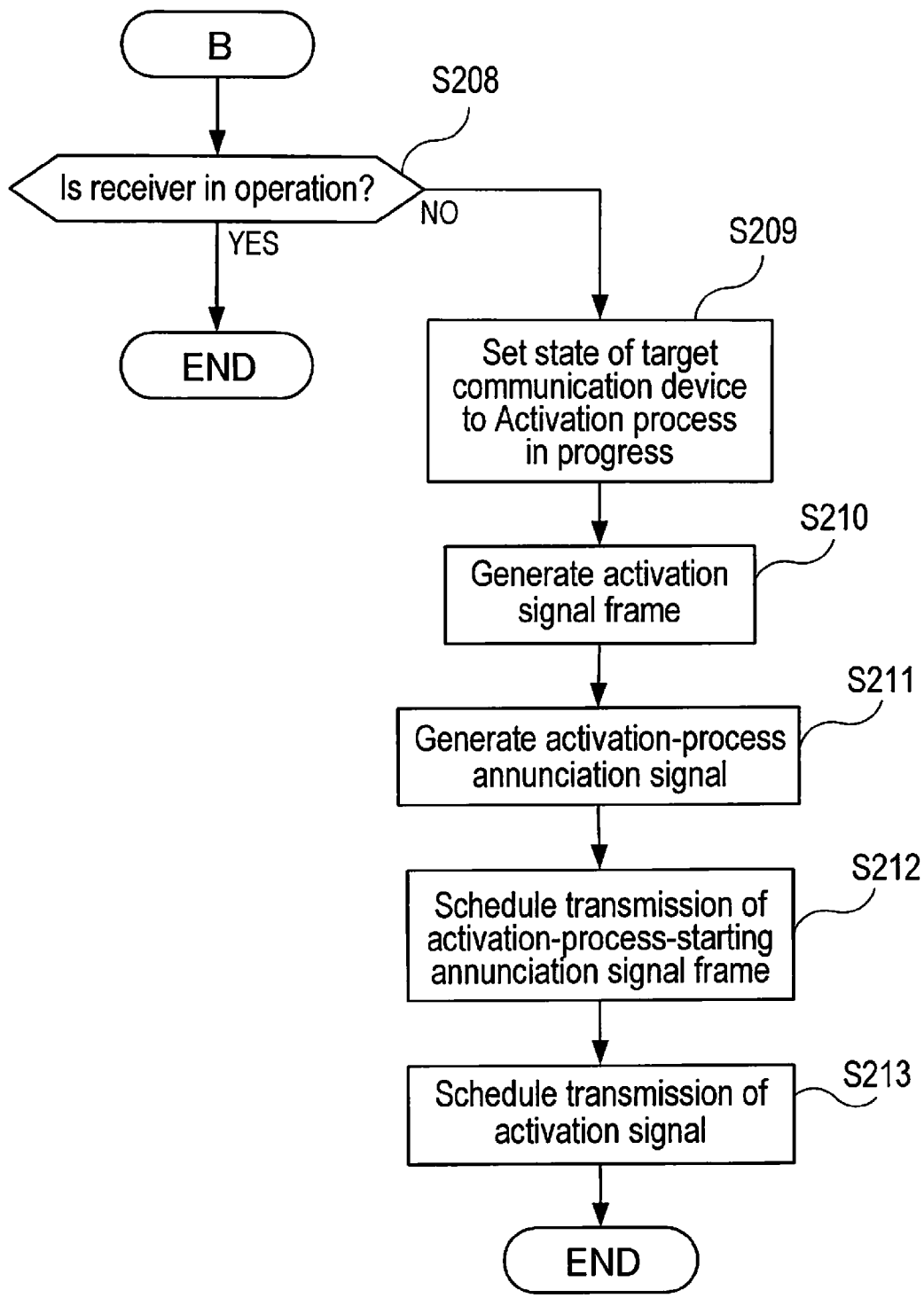
FIG. 8B is a flowchart showing a flow of operation triggered by reception of a frame in the repeater device.
Figure 8C:
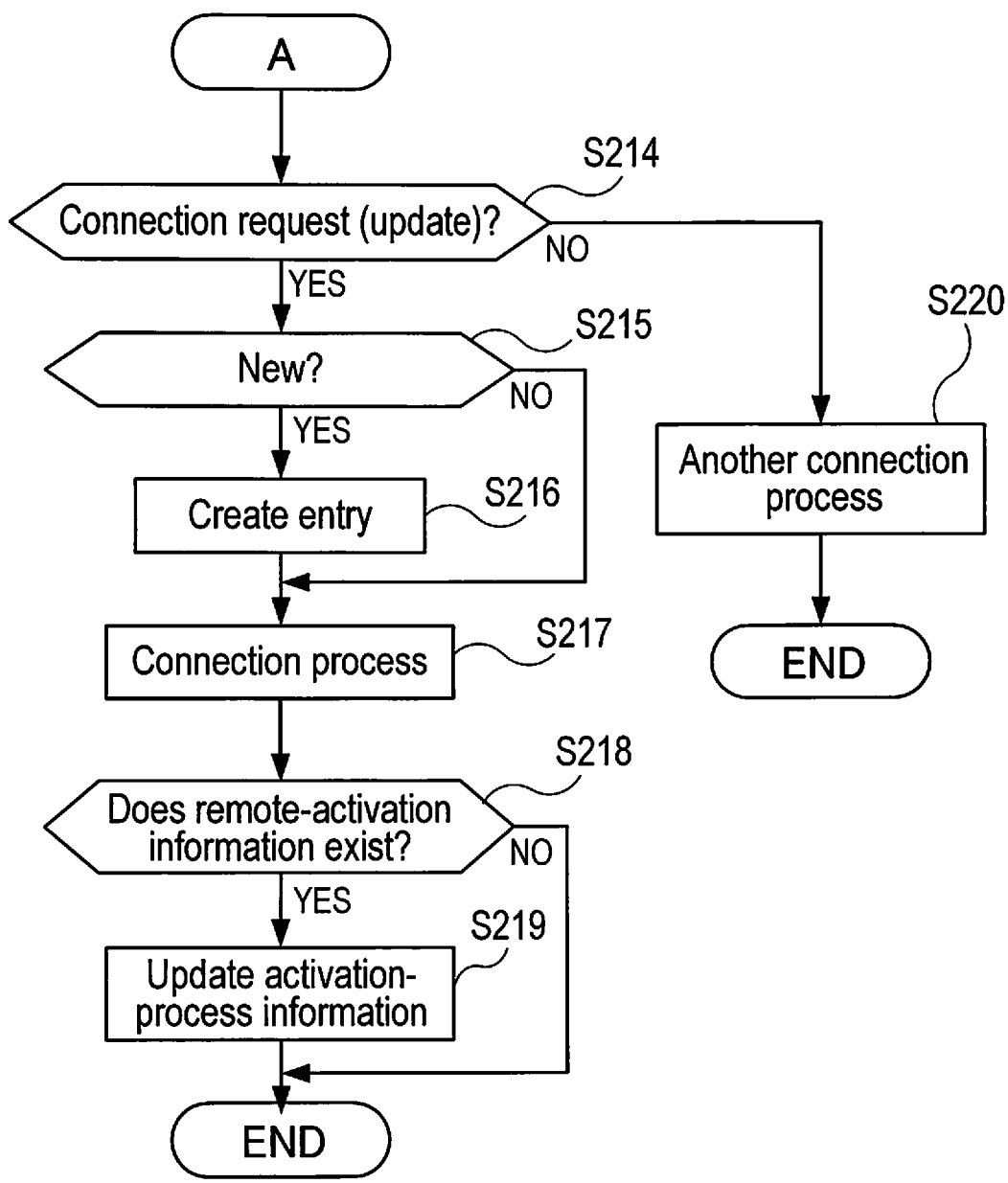
FIG. 8C is a flowchart showing a flow of operation triggered by reception of a frame in the repeater device.

First, with reference to FIGS. 8A to 8C, the first flow will be described. FIGS. 8A to 8C are flowcharts showing the flow of operation that starts at a time when a frame of the repeater device 100 is received.

First, the communication I/F 101 receives a frame. Then, in the reception processing unit 102, a reception process is performed on the frame (Step S201). The frame that has undergone the reception process is stored in the frame storage unit 104 (Step S202).

Then, the determination unit 105 makes a determination as to whether the frame stored is a data frame (Step S203). The data frame is a frame used to transmit data such as an IP packet, for example, and is distinguished from control frames such as a connection request frame or arrival confirmation frame. Incidentally, according to a protocol that involves no exchange of control information but only exchange of data, the inside of the data frame may need to be analyzed to make a determination as to whether the frame is a data frame. For example, if a protocol involving exchange of control information on TCP (Transmission Control Protocol) or UDP (User Datagram Protocol) is used, a process of detecting a frame in which the above protocols are stored applies. Incidentally, in the following description, an embodiment of exchanging control information using upper-level protocols will not be mentioned. However, the present embodiment can apply similarly.

If it is determined at step S203 that the frame is a data frame (Step S203-YES), the determination unit 105 confirms the state of a destination communication device (Step S204). The determination unit 105 makes a determination as to whether a communication device specified as a receiver of the frame is in operation (Step S205). The determination process is performed based on information stored in the storage unit 107. For example, the operating state 503 of FIG. 5 is referenced before a determination is made as to whether the communication device is in operation.

If the determination unit 105 determines at step S205 that the communication device, which is a receiver of the frame, is in operation (Step S205-YES), the repeater device 100 transfers the frame to the receiver communication device. Specifically, first the determination unit 105 issues a transmission instruction to the transmission processing unit 103. After receiving the transmission instruction, the transmission processing unit 103 reads the frame from the frame storage unit 104 (Step S206). The transmission processing unit 103 performs a transmission process on the frame that has been read (Step S207), and transmits the frame to the network via the communication I/F 101.

If the determination unit 105 determines at step S205 that the communication device, which is a receiver of the frame, is not in operation (Step S205-NO), the determination unit 105 makes a determination, for the communication device that is a receiver of the frame, as to whether a remote activation process is in progress (S208). If it is determined that the remote activation process is in progress (Step S208-YES), the repeater device 100 ends the process. At this time, the received frame has already been stored in the frame storage unit 104. Therefore, the received frame is transmitted after the remote activation process is completed.

If the remote activation process is not in progress (Step S208-NO), the determination unit 105 reads information about a target communication device from the storage unit 107, and changes an entry of the storage unit 107 of the communication device to "Activation process in progress" (Step S209).

Since the entry is changed to "Activation process in progress," the communication device buffers all frames in the frame storage unit 104 after the frames addressed and transmitted to the target communication device are received. Incidentally, it is unnecessary for all frames to be buffered. Various measures may be taken according to implementation forms.

In the frame storage unit 104, a data frame addressed and transmitted to a communication device whose activation process is in progress may take a longer buffer retention time than a data frame transmitted to a communication device that is in any operation other than the activation process. If the length of the buffer is made longer than normal, or if the stored frame is retransmitted to a communication device, a process of increasing a period of time before retransmission is tried, a process of increasing the number of times retransmission is tried, or any other process may be performed. As a result, the loss of frames can be further avoided.

Incidentally, as for an operation of increasing the buffer retention time, an operation of increasing a period of time before the retransmission of a frame is tried, an operation of increasing the number of times frames are retransmitted, and any other operation, a threshold value may be set and stored in each communication device in advance, and the communication devices may be operated based on the threshold values. The repeater device 100 may operate in accordance with a threshold value that the repeater device 100 is notified of by a communication device. As a notification means for allowing a communication device to notify the repeater device 100 of a threshold value, a frame for making a new connection request of the communication device may be used, for example.

When the connection management unit 106 of the wireless repeater device 100 finds in the new-connection-request frame received from the communication device a parameter in which the threshold value is described, all that is required is for the connection management unit 106 to store the parameter in the storage unit 107 in such a way that the parameter becomes associated with the communication device.

FIG. 10 is a table showing an embodiment in which a parameter concerning an activation process is also stored as information that the repeater device 100 manages and stores in the storage unit 107. In a column 2000 named as "Measures during activation process" in FIG. 10, measures are stored for a communication device whose activation process is in progress, such as the buffer retention time, the period of time before the retransmission of a frame is tried, and a threshold value for the number of times frames are retransmitted.

The following describes a process by the repeater device 100 of activating a frame-receiver communication device after the process of step S209 is performed. The determination unit 105 instructs the activation signal generation unit 109 to generate an activation signal frame, along with information stored in an entry corresponding to the frame-receiver communication device. The activation signal generation unit 109 generates an activation signal frame (Step S210), and stores the activation signal frame in the frame storage unit 104.

Then, the determination unit 105 instructs the annunciation signal generation unit 108 to generate an activation-process annunciation signal frame in order to create a communication state suitable for transmitting the activation signal frame in a stable manner. The annunciation signal generation unit 108 generates an activation-process annunciation signal frame (Step S211), and stores the activation-process annunciation signal frame in the frame storage unit 104. Incidentally, if the communication method is a communication method by which the start and end of a section for transmitting the activation signal frame can be represented by different activation-process annunciation signals, the annunciation signal generation unit 108 generates two activation-process annunciation signals, i.e. an annunciation signal for starting the activation process and an annunciation signal for ending the activation process. If the communication method is a communication method in which the end of a section for transmitting the activation signal frame is obvious, all that is required is for the annunciation signal generation unit 108 to generate an annunciation signal for starting the activation process.

Then, the determination unit 105 makes a schedule for transmitting the activation-process annunciation signal frame and the activation signal frame at appropriate timings (Step S212, Step S213), and ends the process. For example, if the communication method is required to create only an annunciation signal for starting the activation process, first a transmission schedule of the annunciation signal for starting the activation process is created (Step S212) before a transmission schedule of the activation signal frame is created (Step S213).

After the transmission of the annunciation signal frame and the activation signal frame is completed based on the schedules of the determination unit 105, an entry corresponding to a communication device to which the frame of the storage unit 107 has been transmitted is updated. Incidentally, the activation-process annunciation signal frame and the activation signal frame are transmitted based on the timer management described later.

That is, the operating state, among the entries of FIG. 5, is updated from "Activation process in progress" to "Operation in progress." As a result, a process of transferring a frame buffered in the frame storage unit 104 to a frame-receiver communication device is restarted. If a process of increasing the buffer retention time of the frame or of increasing the length of the buffer has been performed during the activation process of the communication device, the buffer retention time or buffer length is reset to that of a normal frame, which is performed during the operating state of the communication device.

If the frame is not a data frame at the above-mentioned step S203 (Step S203-NO), the determination unit 105 makes a determination as to whether the frame is a connection request (or update request) or not (Step S214). If the frame is not a connection request (Step S214-NO), the repeater device 100 performs a process specified for each control frame (Step S220), and ends the process.

If the received frame is a connection request (or update request) at step S214 (Step S214-YES), the determination unit 105 makes a determination as to whether the connection request is a new one (Step S215). If the frame contains information about whether the connection request is a new one, then the determination unit 105 references the information before making the determination. If the frame does not contain information about whether the connection request is a new one, the determination unit 105 makes the determination based on whether the information about a communication device that is a target of the received frame is stored in the storage unit 107. If the connection request is a new connection request (Step S215-YES), an entry for storing information about a target connection device is created in the storage unit 107 (Step S216). If the connection request is not a new connection request (Step S215-NO), a new entry is not created.

Then, the repeater device 100 performs a connection process for a communication device that transmits the connection request (Step S217). The determination unit 105 makes a determination as to whether the connection request contains information about remote activation (Step S218). If the connection request contains information about remote activation (Step S218-YES), an entry is updated with the use of the information about remote activation (Step S219). If the connection request does not contain information about remote activation (Step S218-NO), the process comes to an end.

The following describes a second operational flow associated with timer management of the repeater device 100. For example, the second flow is an operational flow for transmitting an annunciation signal frame at regular intervals from the repeater device 100 to a communication device. Moreover, the timer management of a schedule that is determined by the above first flow and is used to transmit an activation-process annunciation signal frame and an activation signal frame is performed, and, under the timer management, the activation-process annunciation signal frame and the activation signal frame are transmitted.

Figure 9A:
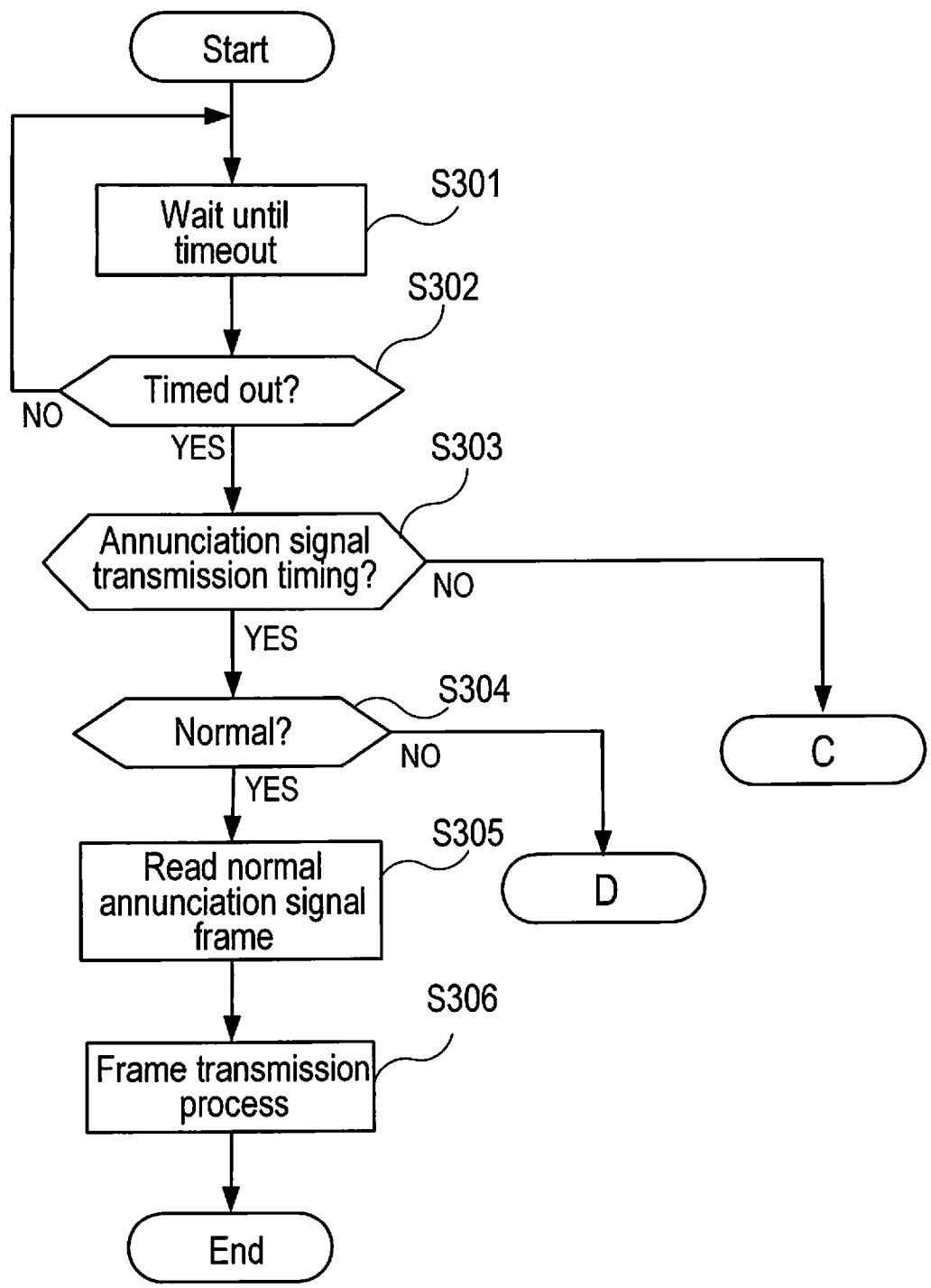
FIG. 9A is a flowchart showing a flow of operation of a timer process in the repeater device.
Figure 9B:
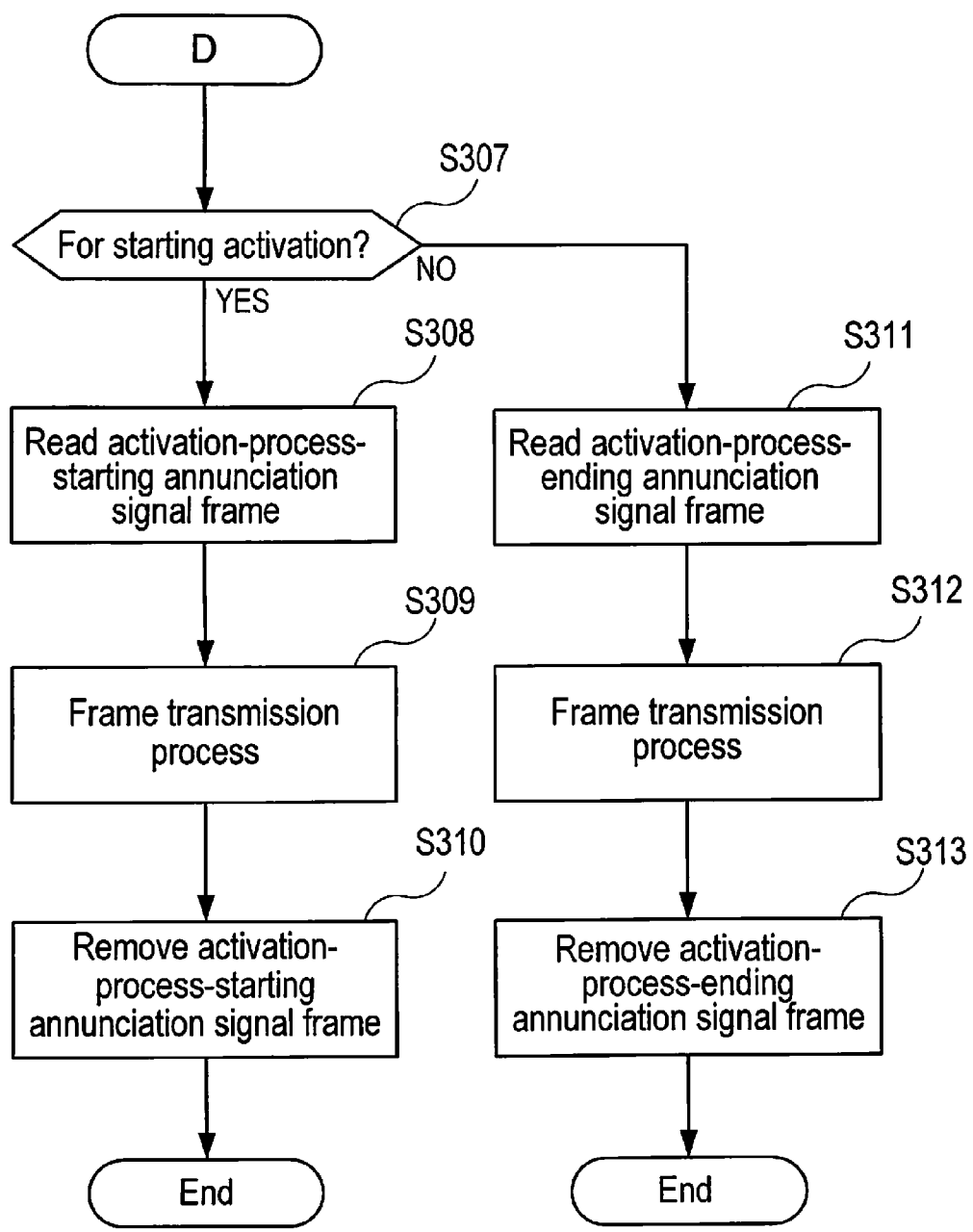
FIG. 9B is a flowchart showing a flow of operation of the timer process in the repeater device.
Figure 9C:
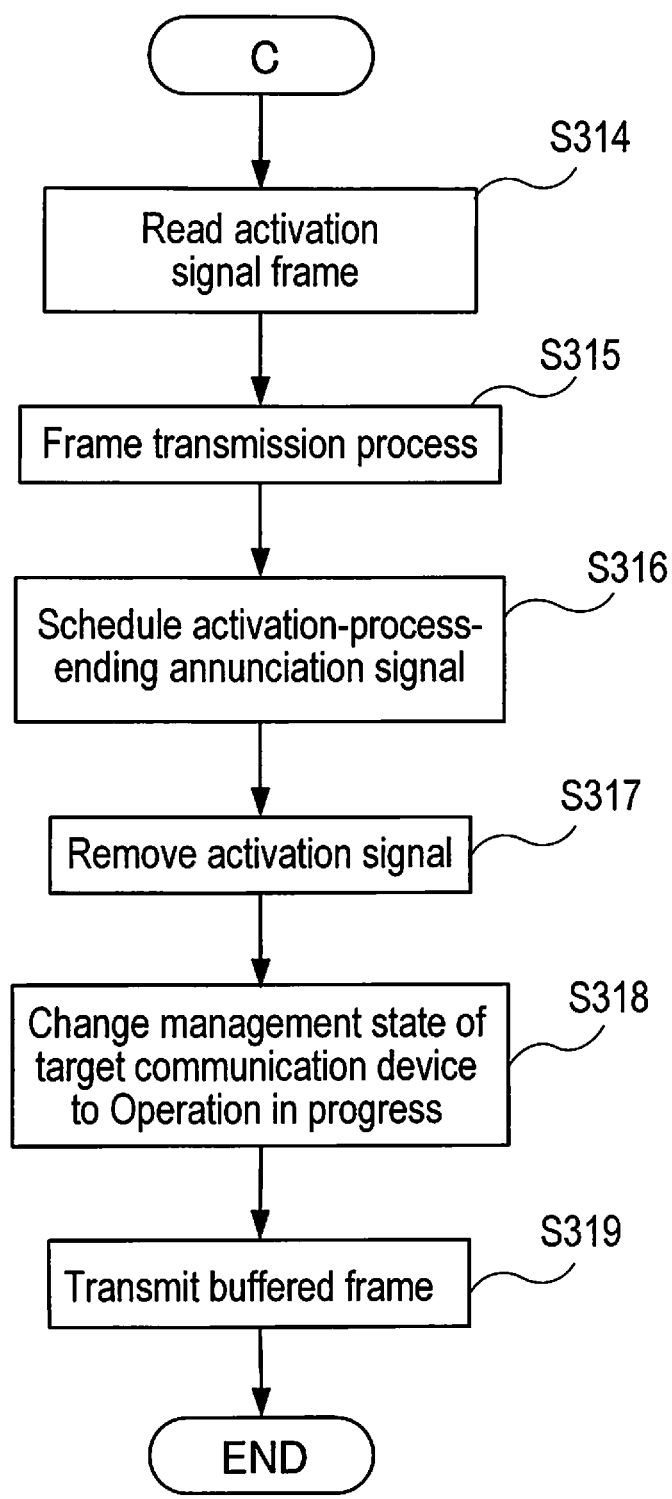
FIG. 9C is a flowchart showing a flow of operation of the timer process in the repeater device.

FIGS. 9A to 9C are flowcharts showing a flow of operation by the repeater device 100, which is attributable to the timer.

First, after the start of the present operation, the repeater device 100 waits until the timer times out (Step S301 to Step S302). After the timer has timed out, the determination unit 105 makes a determination as to whether the timing of the time-out is a timing at which an annunciation signal frame is transmitted (Step S303). At step S303, if the timing is a timing at which an annunciation signal frame is transmitted (Step S303-YES), the determination unit 105 makes a determination as to whether to transmit a normal annunciation signal frame or an activation-process annunciation signal frame (Step S304). If it is determined that a normal annunciation signal frame should be transmitted (Step S304-YES), the repeater device 100 reads an annunciation signal that is previously created and stored in the frame storage unit 104 and performs a transmission process thereon before transmitting the annunciation signal to the network (Step S305 to Step S306).

The following describes activation-process annunciation signals produced by the repeater device 100. As for the activation-process annunciation signals, there are the following cases: the case where two annunciation signals, i.e. an annunciation signal for notifying the start of an activation process and an annunciation signal for notifying the end of an activation process, are used; and the case where only an annunciation signal for notifying the start of an activation process is used, and the repeater device 100 returns to a normal operation after a predetermined period of time has passed.

If it is determined that an annunciation signal frame indicating an activation process is to be transmitted (Step S304-NO), the determination unit 105 makes a determination as to whether to transmit an annunciation signal frame indicating the start of an activation process or an annunciation signal frame indicating the end of an activation process (Step S307). If the determination unit 105 determines that an annunciation signal frame indicating the start of an activation process is to be transmitted (Step S307-YES), the repeater device 100 reads an annunciation signal frame for starting an activation process from the frame storage unit 104 and transmits the annunciation signal frame (Step S308 to Step S310). If the determination unit 105 determines that a signal indicating the ending of an activation process is to be transmitted (Step S307-NO), the repeater device 100 reads an annunciation signal frame for ending an activation process from the frame storage unit 104 and transmits the annunciation signal frame (Step S311 to Step S313).

At step 5303, if the determination unit 105 determines that the timing is not a timing at which an annunciation signal frame is transmitted (Step S303-NO), the repeater device 100 reads an activation signal frame from the frame storage unit 104, and transmits the activation signal frame (Step S314 to Step S315). After that, the determination unit 100 schedules the transmission of an annunciation signal frame indicating that the activation process has ended (Step S316), and removes the transmitted activation signal frame from the frame storage unit 104 (S317). Then, the operating state of a communication device to which the activation signal frame is transmitted is changed from "Activation process in progress" to "Operation in progress" (Step S318). The repeater device 100 transmits a frame, which is buffered, to the communication device (Step S319).

Incidentally, the execution of processes (Step S318 to Step S319) of restarting the transmission of a buffered frame does not necessarily come immediately after the activation signal frame is transmitted. In order to avoid the loss of frames, the processes may be executed after a certain period of time has passed since the transmission of the activation signal frame.

The above operational flow has explained that, at step S317, the activation signal frame whose transmission is completed is removed from the storage unit 104. However, the activation signal frame may not be removed.

For example, as shown in FIG. 7, an "activation signal frame" may be associated with an entry of each communication device, which is managed in the storage unit 107, before being stored. In this manner, preparations may be made for future transmission. In the embodiment of FIG. 7, a field that stores an activation signal frame is provided as a column 700, and the activation signal frame is stored in the field. It is clear that a communication device of ID1, which is stored in a row 701, can be activated by an activation signal frame named as F1. Moreover, a communication device of ID2, which is stored in a row 702 is in a resting state; the row 702 is blank because no activation signal frame has been produced.

According to the repeater device 100 of first embodiment, an activation signal frame is transmitted to a communication device in a non-communication section, thereby ensuring that the activation signal frame reaches the communication device. As a result, the communication device is remotely activated without fail.

Incidentally, for example, the repeater device 100 can be realized by using a general-purpose computer as basic hardware. That is, the communication I/F 101, the reception processing unit 102, the transmission processing unit 103, the frame storage unit 104, the determination unit 105, the connection management unit 106, the storage unit 107, the annunciation signal generation unit 108, and the activation signal generation unit 109 can be realized by execution of a program by a processor mounted on the above computer device. In this case, the repeater device 100 may be realized by previously installing the above program on the computer device. The program may be stored in a storage medium such as CD-ROM, or the above program may be distributed via the network; the repeater device 100 may be realized by appropriately installing the program on the computer device. The frame storage unit 104 and the storage unit 107 may be realized by appropriately using a built-in memory in the above computer device, an external memory connected to the above computer device, a hard disk, CD-R, CD-RW, DVD-RAM, DVD-R or any other storage medium.

[Second Embodiment]

The following describes a repeater device 1100 of second embodiment. In addition to a process by the repeater device 100 of first embodiment of activating a communication device in a non-communication section, the repeater device 1100 confirms the activation of a to-be-activated communication device.

Figure 11:
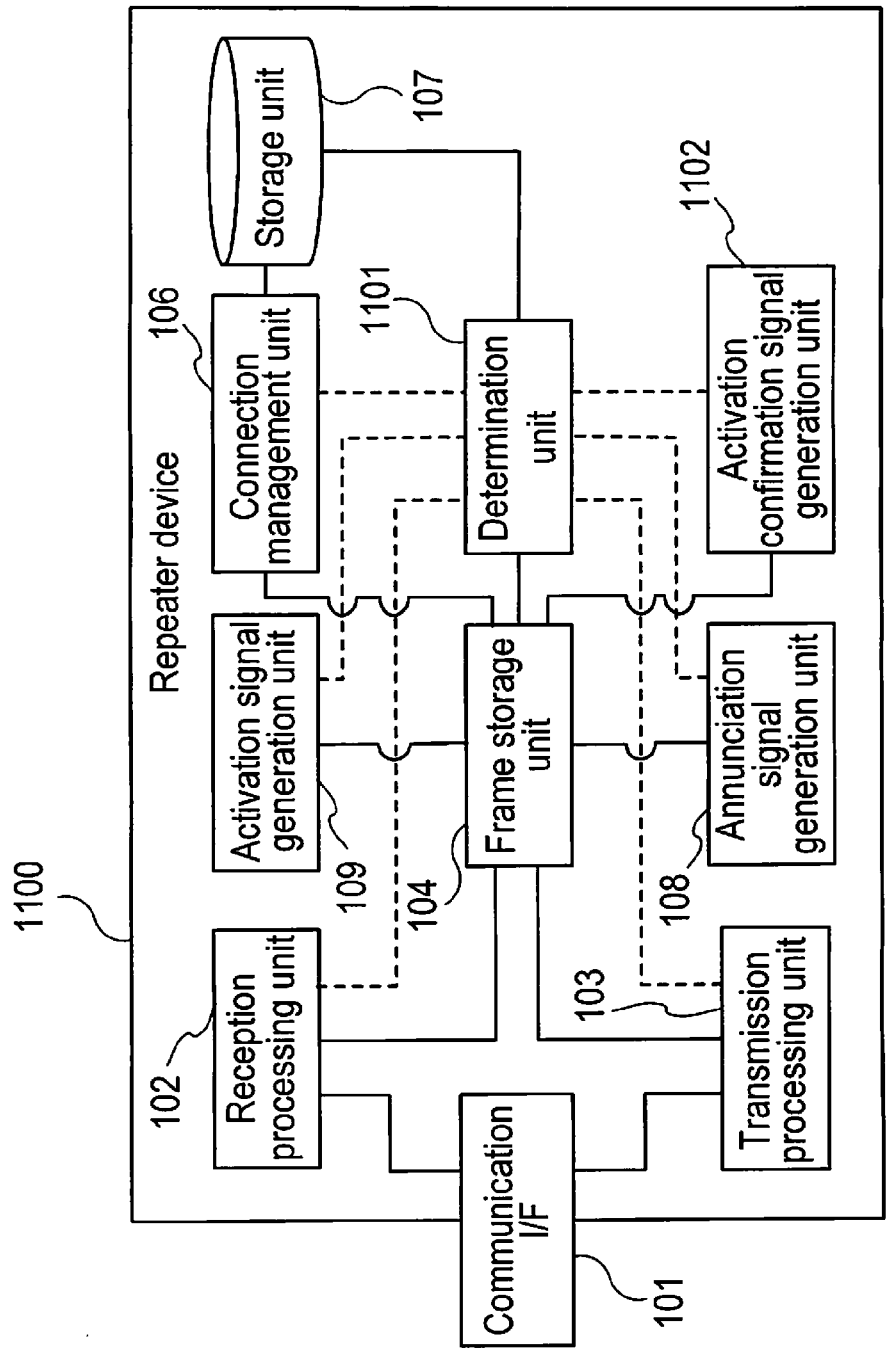
FIG. 11 is a block diagram showing the configuration of a repeater device according to second embodiment.

FIG. 11 is a block diagram showing the configuration of the repeater device 1100 of second embodiment.

Among the components of the repeater device 1100, the components modified from those of the repeater device 100 of first embodiment are a determination unit 1101 and an activation confirmation signal generation unit 1102.

The activation confirmation signal generation unit 1102 has a function of generating, on the basis of an instruction from the determination unit 1101 and from information contained in a frame stored in the frame storage unit 104, an activation confirmation frame, which is used to confirm whether a communication device has been appropriately activated; and storing the generated activation confirmation frame in the frame storage unit 104.

In addition to the functions that the determination unit 105 of the repeater device 100 of first embodiment has, the determination unit 1101 has the following functions. The first function is of issuing an instruction to the activation confirmation signal generation unit 1102 to generate an activation confirmation frame and using the generated activation confirmation frame to confirm whether a to-be-activated communication device has been activated. The second function is of restarting the transmission of a frame buffered in the frame storage unit 104 when a to-be-activated communication device has been activated, and of returning to a normal state when a state different from a normal state, such as one in which a frame's buffer retention time is made longer during activation, emerges.

Figure 12:
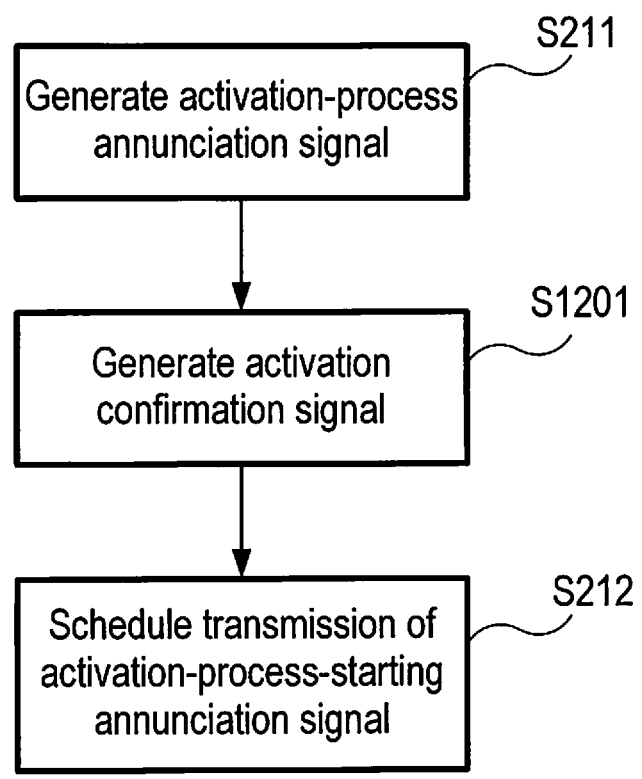
FIG. 12 is a flowchart showing a flow of operation triggered by receiving of a frame in the repeater device of second embodiment.

The following describes an operation of the repeater device 1100 having the above configuration. FIG. 12 is a flowchart showing a flow of operation by the repeater device 1100, which starts after a frame is received. In the flowchart of FIG. 12, the description of steps at which the same operations as those of FIGS. 8A to 8C are performed will be omitted. The flowchart shows only an operational flow unique to second embodiment.

As for the flowchart of FIG. 12, the following is different from the flowchart of FIG. 2: Between the process (Step S211) of generating an annunciation signal frame and the process (Step S212) of scheduling the transmission of an annunciation signal frame, a process (Step S1201) of generating an activation confirmation signal frame, which is used to confirm the activation of a communication device, is added. The type of an activation confirmation signal frame and a confirmation method thereof will be described later.

Figure 13A:
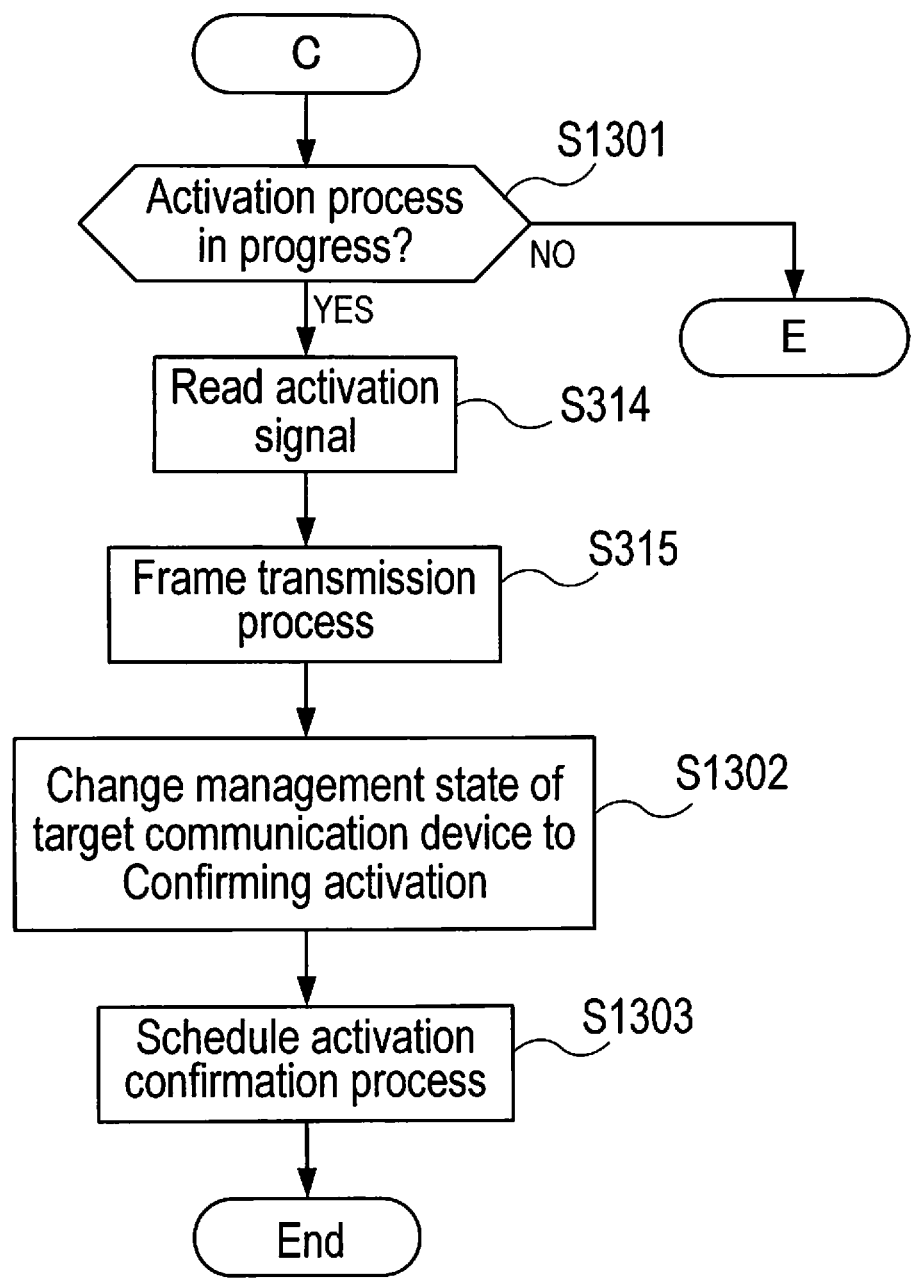
FIG. 13A is a flowchart showing a flow of operation of a timer process in the repeater device of second embodiment.
Figure 13B:
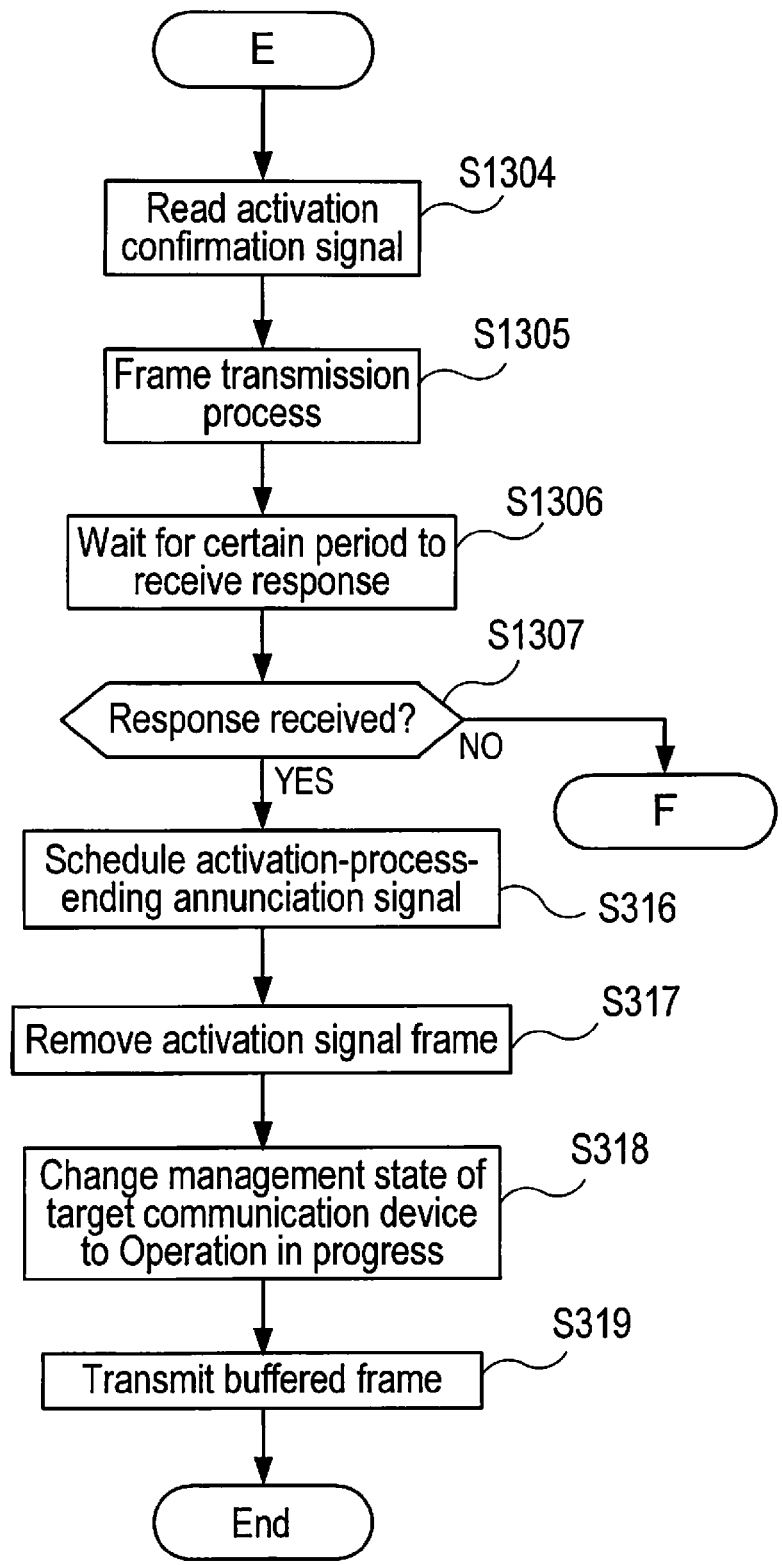
FIG. 13B is a flowchart showing a flow of operation of the timer process in the repeater device of second embodiment.
Figure 13C:
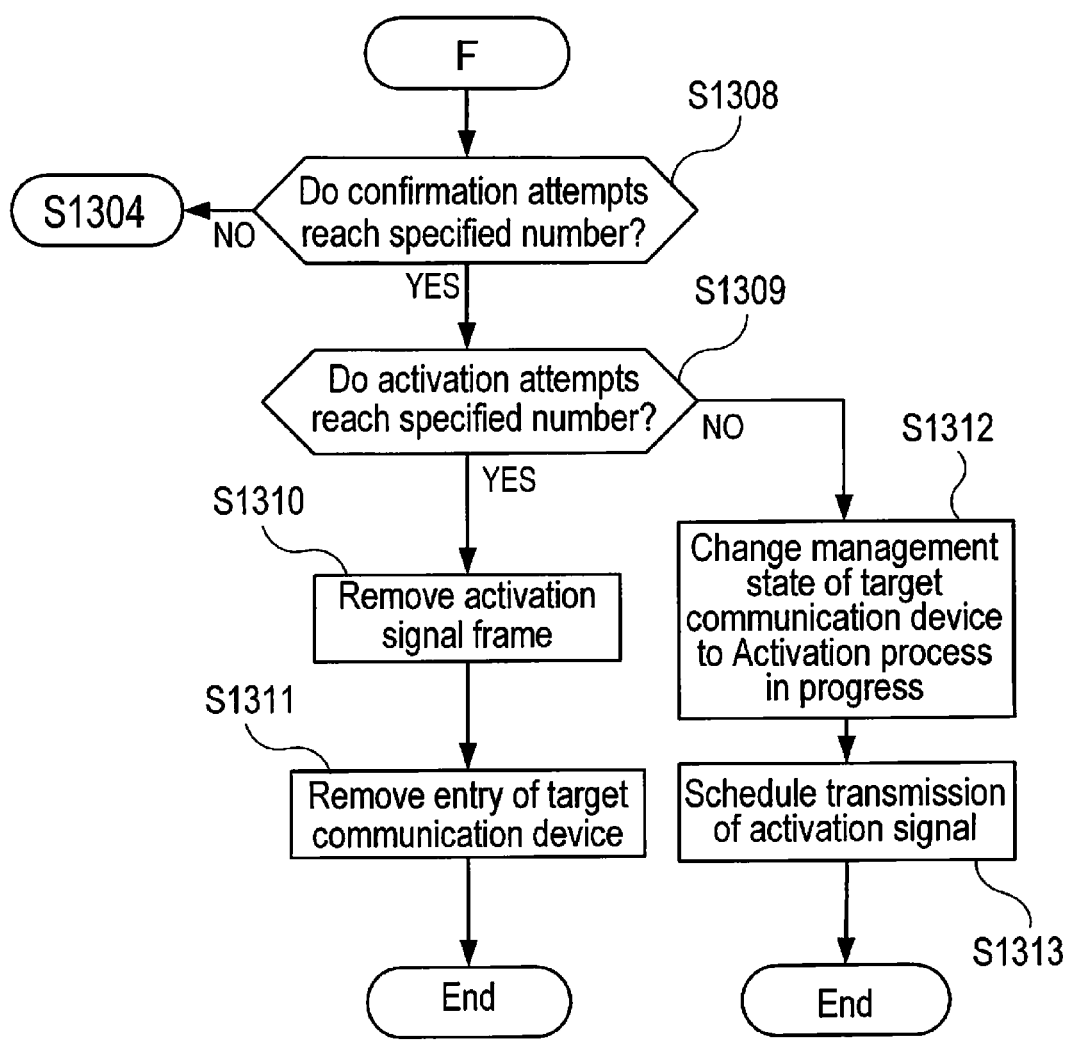
FIG. 13C is a flowchart showing a flow of operation of the timer process in the repeater device of second embodiment.

FIGS. 13A to 13C are flowcharts showing a flow of operation by the repeater device 1100, which is attributable to the timer. The description of steps at which the same operations as those in FIG. 9A are performed will be omitted. In the flowcharts of FIGS. 13A to 13B, part of the flow that is used for transmitting an activation signal frame has been altered.

If the timing is not a timing at which an annunciation signal frame is transmitted (Step S303-NO), a determination is made as to whether a frame-destination communication device is "Activation process in progress" (Step S1301). If the communication device is "Activation process in progress" (Step S1301-YES), an activation signal frame is read from the frame storage unit 104 and transmitted (Step S314 to S315). Then, the operating state of the frame-destination communication device, which is managed in the storage unit 107, is changed to "Confirming activation" (Step S1302), and the transmission of an activation confirmation frame is scheduled (Step S1303).

At step S1301, if the operating state of the communication device is not "Activation process in progress" (Step S1301-NO), then the operating state of the target communication device is "Confirming activation." In this case, the repeater device 1100 performs an activation confirmation process. Specifically, an activation confirmation frame is read from the frame storage unit 104 (Step S1304), and transmitted to the network (Step S1305). Then, in order to wait for a response signal from the target communication device to the activation confirmation frame from the target communication device, the repeater device 1100 waits for a certain period of time (Step S1306). Then, a determination is made as to whether the response signal has been received (Step S1307). If there is a response signal to the activation confirmation frame from the target communication device (Step S1308-YES), then it is determined that the target communication device has been activated. The transmission of an annunciation signal for notifying the end of the activation process is scheduled (Step S316), and the activation signal frame is removed from the frame storage unit 104 (Step S317). After that, the state of the communication device, which is managed in the storage unit 107, is changed to "Operation in progress" (Step S318), and a process of transferring a data frame, which is buffered in the frame storage unit 104, starts (Step S319).

At step S1308, if there is no response signal from the target communication device (Step S1307-NO), a confirmation is made as to whether the number of times an activation confirmation process is tried has reached a specified value (Step S1308). The specified value may be a unique value that the determination unit 1101 includes, or may be stored in the storage unit 107 and referenced by the determination unit 1101 when necessary. At step S1308, if the activation confirmation process has reached the specified value (Step S1308-YES), then a confirmation is subsequently made as to whether the number of times an activation process is tried has reached a specified value (Step S1309). In a similar way to the above specified value for the confirmation process, the specified value may be a unique value that the determination unit 1101 includes, or may be stored in the storage unit 107 and referenced by the determination unit 105 when necessary.

If the number of times an activation process is tried has reached the specified value (Step S1309-YES), it is determined that the communication device cannot be remotely activated, and an activation process is canceled. Specifically, the activation signal frame is removed from the frame storage unit 104 (Step S1310), and an entry of the communication device in the storage unit 107 is removed (Step S1311). At this time, if the determination unit 1101 is able to perform a process of IP layer, an error response that uses ICMP (ICMP Host Unreachable, for example) may be transmitted to a frame-source communication device.

At step S1309, if the number of times an activation process is tried has not reached the specified value (Step S1309-NO), an activation process is retried. A state contained in the entry of the target communication device of the storage unit 107 is changed to "Activation process in progress" (Step S1312), and the transmission of an activation signal frame is scheduled (Step S1313).

At step S1308, if the activation confirmation process has not reached the specified value (S1308-NO), the process returns to step S1304 to perform an activation confirmation process again.

A to-be-activated communication device may previously notify the repeater device 1100 of threshold values for the number of times activation is tried, the number of times activation confirmation is tried, a period of time from when an activation signal frame is transmitted until activation confirmation is made, and the like; the repeater device 1100 may perform an operation in accordance with the threshold values. For example, the communication device notifies each threshold value using a frame used to make a new connection request. After the repeater device 1100 receives each threshold value, the connection management unit 106 stores the threshold values in corresponding entries of the storage unit 107. FIG. 14 shows the entries in which the repeater device stores each threshold value.

In the case of FIG. 14, to the management information shown in FIG. 5, entries of the "number of times activation is tried, " the "number of times confirmation is tried" and the "period of time until activation confirmation" are added. For example, in a row (1406) representing a communication device of ID1, all parameters are stored. Ina row (1407) representing a communication device of ID2, only some of the parameters are stored. In this manner, as for the parameters that the communication device does not support, the fields can be blank.

The following describes an activation confirmation frame used by the repeater device 1100 of second embodiment and an activation confirmation process that uses the activation confirmation frame.

The activation confirmation frame is generated based on information contained in a frame that the repeater device 1100 relays. The information contained in the frame is, for example, generated with the use of a MAC address or IP address. Among the information contained in the frame, depending on information that is used, methods of confirming the activation of a communication device differ.

When only a MAC address is used among the information contained in the frame, it is possible to confirm activation at a data link layer level, such as IEEE802.11, of a communication device. In the case of a method that uses only a MAC address, a protocol by which a response can be obtained at the data link layer level is used. For example, IEEE802.11 is used. In that case, as an activation confirmation frame, a NULL frame, which is defined in IEEE802.11, is used, for example. In the case of the NULL frame, a receiver's address is the MAC address of a communication device whose activation is to be confirmed, and a source address is the MAC address of the repeater device. If it is confirmed that ACK has been received as a response to the NULL frame, then it is determined that a target communication device becomes activated.

When an IP address, as well as a MAC address, is used among the information contained in the frame, it is possible to confirm activation at an IP layer level of a communication device. In this case, as an activation confirmation frame, for example, an ARP packet, ICMP Echo Request packet, ICMPv6 Echo Request packet or any other packet is used. When the above are used as activation confirmation frames, it can be determined that a target communication device becomes activated after it is confirmed that, for each of the packets, ARP Reply, ICMP Echo Reply, ICMPv6 Echo Reply have been received. When an activation confirmation frame is generated with the use of a MAC address and an IP address, it is possible to recognize an event that an upper-level layer above a network interface does not become activated due to troubles or the like even if the network interface is operating when the event occurs. In this manner, it is possible to confirm the activation state of the communication device in greater detail. In particular, when a communication device performs an operation of not terminating a data link layer connection in preparation for remote activation, confirming activation at the IP layer is effective.

For example, when an ARP packet is generated as an activation confirmation frame, the fields of the packet may be filled in the following manner.
1) Header of data link layer level
    Receiver's MAC address: a broadcast address
    Source's MAC address: the MAC address of the repeater device 1100
2) ARP packet
    Source's MAC address: the MAC address of the repeater device 1100
    Source's IP address: the IP address of the repeater device 1100 (which is, however, a source's IP address contained in a frame that triggers remote activation if the repeater device does not have an IP address)
    Target MAC address: All zeros
    Target IP address: a receiver's IP address contained in a frame that triggers remote activation When an ICMP Echo Request packet and an ICMPv6 Echo Request packet are generated as activation confirmation frames, the fields of the packets may be filled in the following manner.
1) Header of data link layer level
    Receiver's MAC address: a receiver's MAC address contained in a frame that triggers remote activation
    Source's MAC address: the MAC address of the repeater device 1100
2) IP header/IPv6 Header
    Source's IP address/Source's IPv6 address: the IP address /IPv6 address of the repeater device 1100 (which is, however, a source's IP address/IPv6 address contained in a frame that triggers remote activation if the repeater device 1100 does not have an IP address/IPv6 address)
    Receiver's IP address/IPv6 address: Receiver's IP address/ IPv6 address contained in a frame that triggers remote activation The repeater device 1100 of second embodiment transmits an activation signal frame to a communication device in a non-communication section. Moreover, the repeater device 1100 transmits to a communication device an activation confirmation frame to confirm whether the communication device becomes activated. In this manner, a confirmation is made as to whether the communication device becomes activated. When it is confirmed that the communication device becomes activated, a data frame is transmitted to the communication device. Since a data frame is transmitted after the activation is confirmed, it is possible to prevent the communication device from not being able to properly receive a frame, a trouble that might occur when the communication device does not become activated (because of the case where an activation signal frame has not been appropriately transmitted, the case where an activation process of a communication device takes more time than expected, or any other reason, for example). That is, it is possible to confirm the activation of a communication device without fail, as well as to transmit a data frame to the communication device without fail. Since a data frame is transmitted after the activation is confirmed, it is possible to prevent the time required to restart the transmission of a data frame from becoming longer than necessary (on the assumption that the activation process takes more time than expected, for example).

[Third Embodiment]

Figure 15:
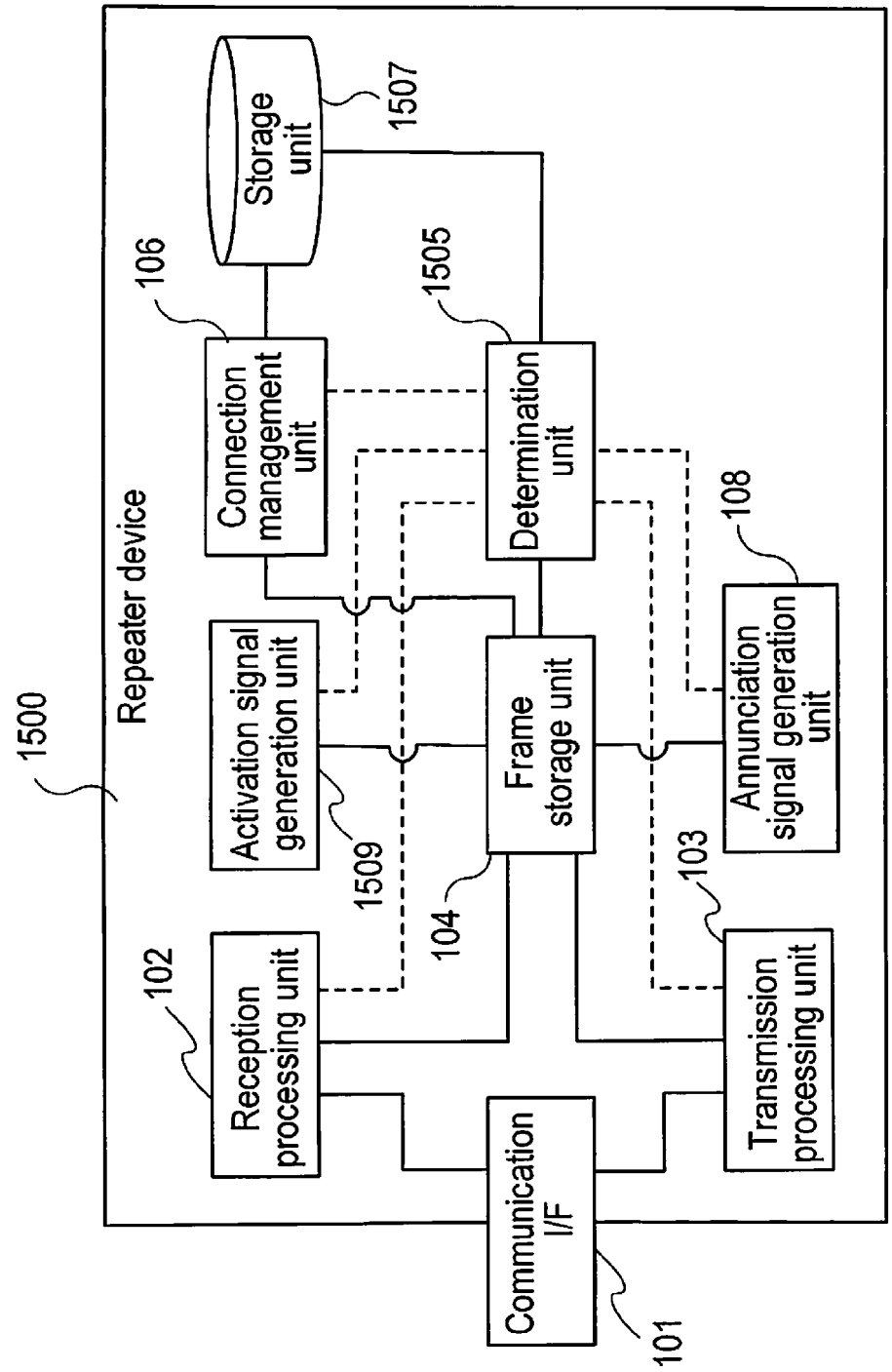
FIG. 15 is a block diagram showing the configuration of a repeater device according to third embodiment.

The following describes a repeater device 1500 according to third embodiment. FIG. 15 is a block diagram showing the configuration of a repeater device of third embodiment.

Compared with the configuration of the repeater device 100 shown in FIG. 1, the functions and operations of a determination unit 1505, a storage unit 1507 and an activation signal generation unit 1509 are different.

In addition to the information that has been so far stored, the storage unit 1507 stores information used to identify a frame that is processed preferentially among frames that the repeater device 1500 relays. The information includes various identifiers that make up a frame, which for example include a source's MAC address and a receiver's MAC address.

If the determination unit 1505 retains an ability to analyze layers leading up to an upper-level layer, a source's IP address, a receiver's IP address, Transport protocol, a source's port number and receiver's port number of TCP or UDP, and the like may also be used. The information about priority may be stored independently of the connection information of a communication device, or may be stored integrally.

FIG. 16 shows one embodiment of the case where the priority information is stored independently in the storage unit 1507. In the embodiment shown in FIG. 16, communication identification information and priority information are stored for three types of communication. The above communication types are each identified by the above-described identifiers. The type of communication in a row 1611 and the type of communication in a row 1613 correspond to each other; are one type of communication; and have different directions.

FIG. 17 shows one embodiment of the case where the connection management information and priority information of communication devices are stored together in the storage unit. In the embodiment shown in FIG. 17, the connection management information of three communication devices (Column 1701 to Column 1704) and the priority information corresponding to each communication device (Column 1705) are stored. The priority information is set at "High," "Medium" or "Low." However, the granularity thereof is not limited to a specific level. Depending on the communication method, the granularity of priority control that can be realized maybe used. If the repeater device 1500 connects two networks having different granularities and priority control methods, the determination unit 1505 of the repeater device 1500 makes an appropriate conversion.

In addition to the above functions, the determination unit 1505 includes a function of making a determination as to whether a received data frame is preferentially transmitted using a communication condition that is stored in the storage unit 1507 and should be prioritized. Based on a result of the determination, the contents of an instruction issued to the activation signal generation unit 1509 and the annunciation signal generation unit 108 are modified.

If it becomes needed to remotely activate a receiver communication device in a data frame that has been determined to be preferentially processed (with high priority), an activation signal that uses a NAV (Network Allocation Vector) described below is generated, and an instruction is issued to transmit. If it is unnecessary to remotely activate the receiver communication device, a non-communication section is set up by the above-mentioned activation-process annunciation signal frame, and then an instruction is issued to transmit an activation signal frame.

In addition to the above-mentioned activation signal frame, the activation signal generation unit 1509 includes a function of generating a signal for setting a NAV that takes into account the time required to propagate an activation signal frame and a signal frame (which corresponds to a second activation signal frame in claim 4) that also plays the role of an activation signal frame while updating the NAV. In this case, the NAV is a frame that sets up a non-communication section where an instruction is issued to a communication device connected to the network not to transmit a frame for a certain period of time.

FIG. 18 is a schematic diagram showing one embodiment of activation signal frames, which have been turned into NAVs, in chronological order. FIG. 18(*a*) is an embodiment in which a group of a plurality of signals is regarded as an activation signal frame. FIG. 18(*b*) is an embodiment in which a single signal makes up an activation signal frame.

In either case, the NAV is so set as to cover an entire activation signal frame. As for both methods, before an activation signal frame is transmitted, frames (which are a frame 1806 and a frame 1807, for example) that are aimed at setting a NAV in accordance with the length of the activation signal frame may be transmitted separately.

If the transmission of an activation signal frame takes more time than a period of time in which a NAV can be set, the frame maybe divided into a plurality of frames as in the upper section, and an activation signal frame may be generated so as to set a plurality of NAVs.

Figure 19:
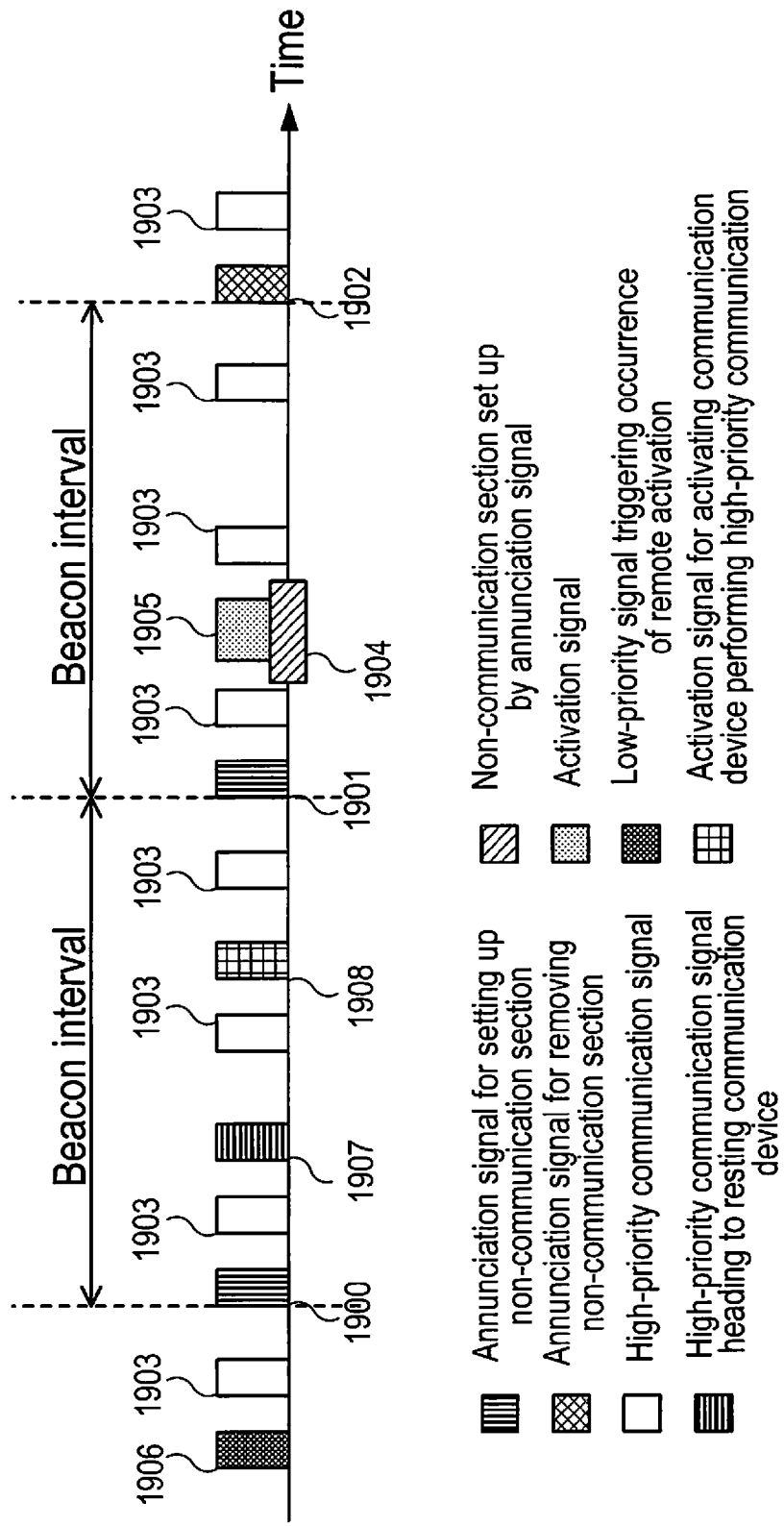
FIG. 19 is a diagram illustrating how a non-communication section is set up.

In third embodiment, take a look at the case where low-priority communication triggers the transmission of an activation signal at a time when high-priority communication goes on. FIG. 19 is a schematic diagram showing the situation where a non-communication section is set up when high-priority communication signals are being transmitted.

A frame 1906 shown in FIG. 19 is a low-priority frame heading to a resting communication device, and a frame that triggers a series of remote activation processes. Frames 1900 and 1901 are annunciation signals for starting activation. A frame 1902 is an annunciation signal for ending activation. Frames 1903 are frames corresponding to high-priority communication. A section 1904 is a non-communication section generated by an activation-starting annunciation signal of the frame 1900. A frame 1905 is an activation signal frame corresponding to low-priority communication, which is transmitted in the non-communication section 1904. A frame 1907 is a frame that is heading to a resting communication device and corresponds to high-priority communication. A frame 1908 is an activation signal frame used to activate a communication device that carries out high-priority communication.

Figure 20A:
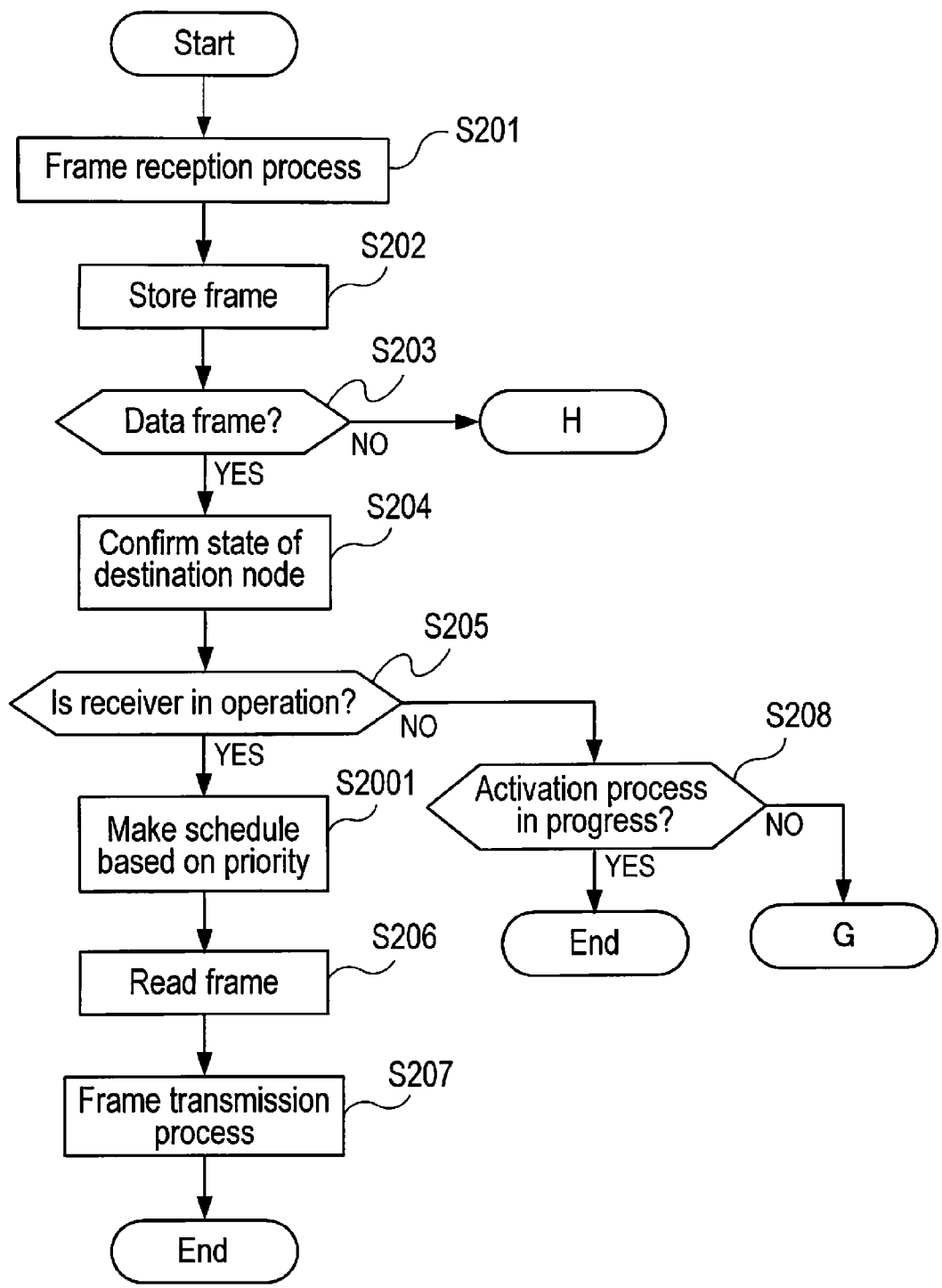
FIG. 20A is a flowchart showing a flow of operation triggered by receiving of a frame in the repeater device of third embodiment.
Figure 20B:
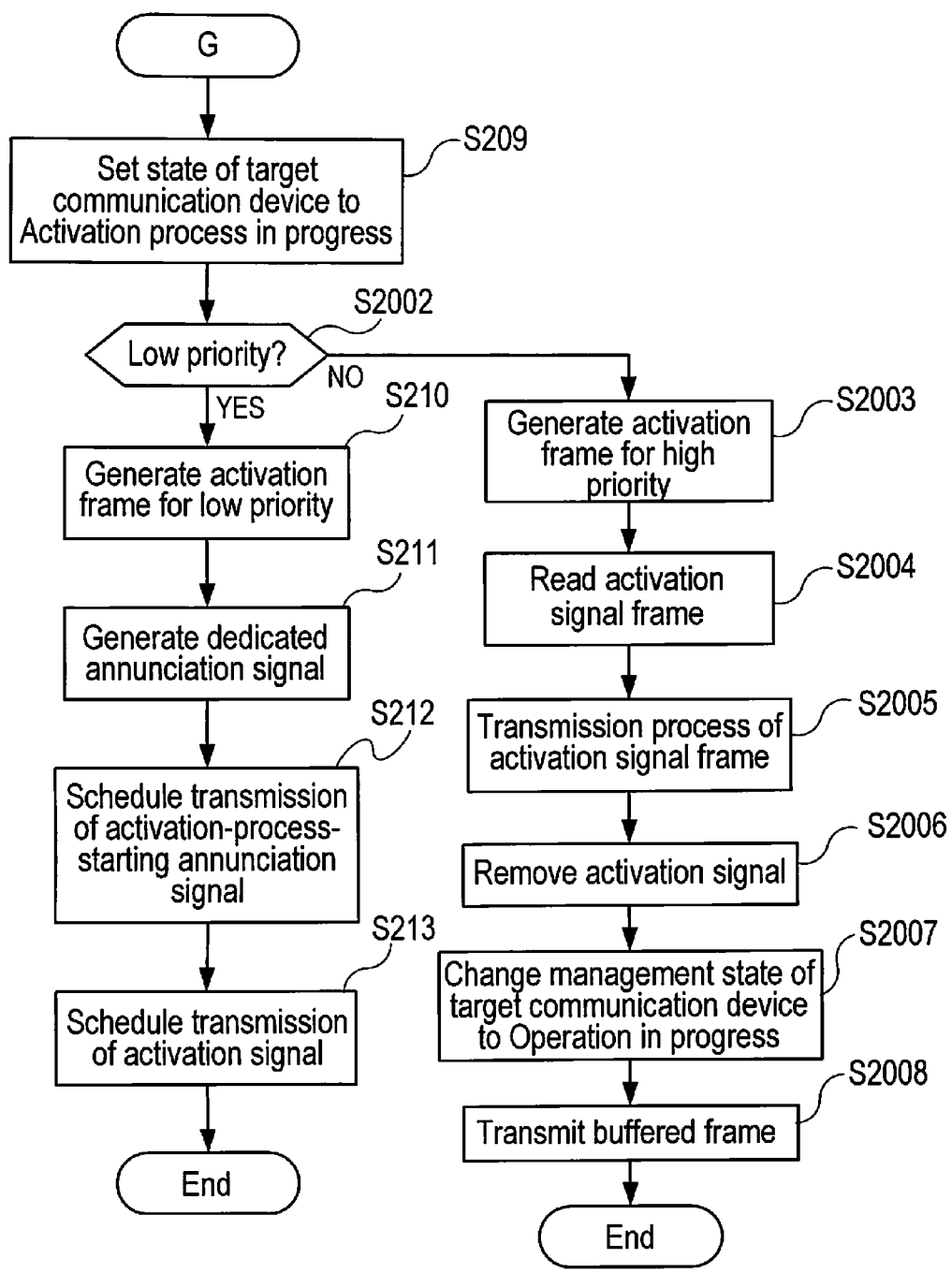
FIG. 20B is a flowchart showing a flow of operation triggered by receiving of a frame in the repeater device of third embodiment.
Figure 20C:
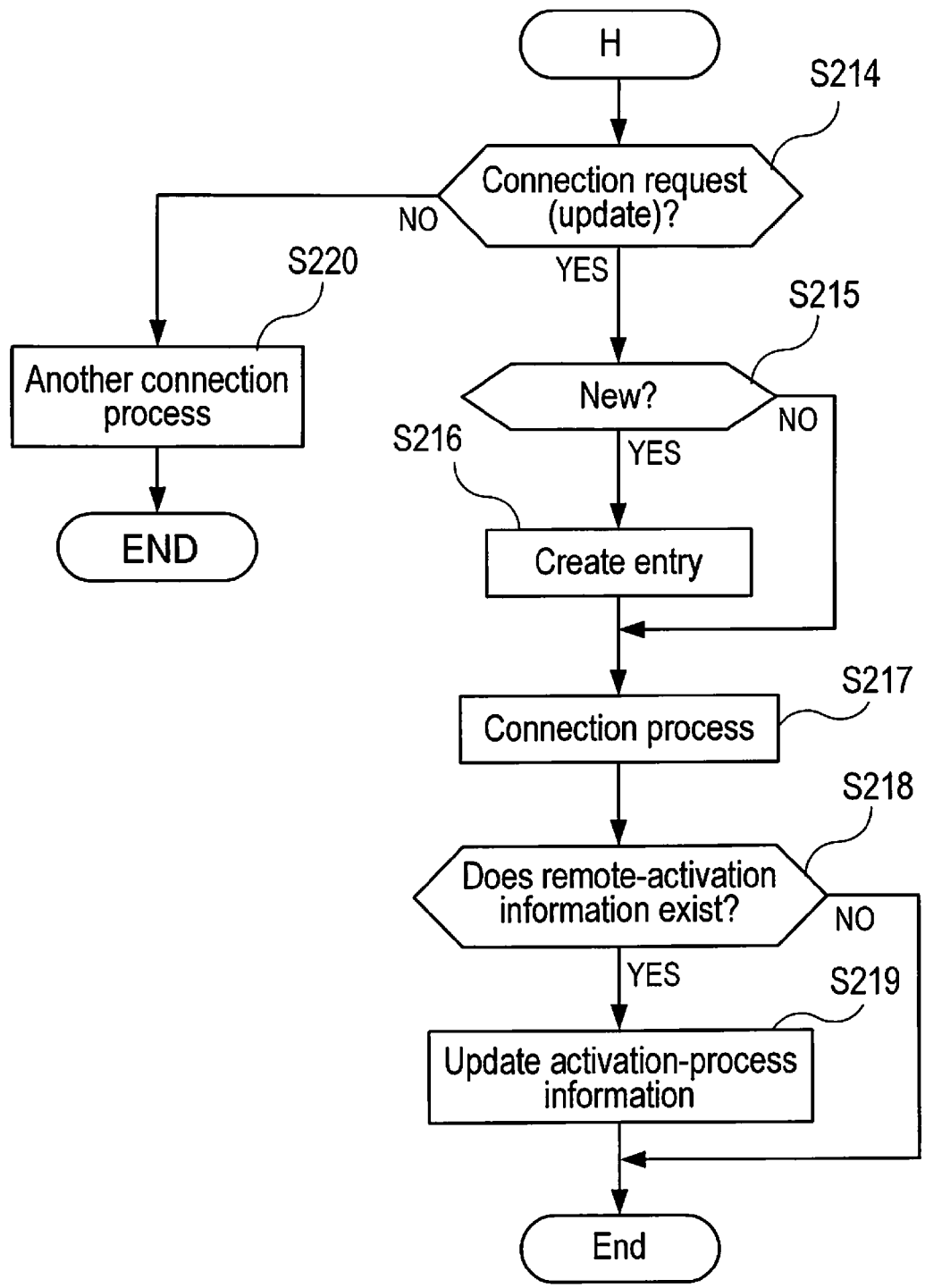
FIG. 20C is a flowchart showing a flow of operation triggered by receiving of a frame in the repeater device of third embodiment.

FIGS. 20A to 20C show operational flows of the repeater device 1500 associated with such a configuration. FIGS. 20A to 20C are flowcharts showing a flow of operation triggered by a process of receiving a frame in the repeater device 1500 of third embodiment.

As shown in FIGS. 20A to 20C, a process of scheduling based on priority at a time when a frame is transferred (Step S2001) and a process of generating and transmitting an activation signal (Step S2002 to Step S2009) have been modified. A series of processes that starts with the generation of an activation signal after a high-priority frame is received and ends with the transmission of the activation signal is continuously performed.

A frame heading to a communication device not in operation is received. If the communication device is not in an activation process (Step S205-NO, Step S208-NO), the state of an entry associated with the communication device, which is stored in the storage unit 1507, is changed to "Activation process in progress" (Step S209). After that, a confirmation is made as to whether the received frame should be preferentially processed or handled as usual (Step S2002).

If the received frame is a frame that should be processed as usual (Step S2002-YES), then the frame is processed in a similar way to that in FIG. 8B. For example, suppose that a series of operational flows has been performed as the frame corresponding to the row 1612 of FIG. 16 has been received. In this case, the row 1612 is categorized as low-priority communication. Therefore, as in the case of FIG. 8B, a remote activation process is performed after a non-communication section is set up by an annunciation signal.

However, an annunciation signal generation unit 1508 of the present embodiment may not only perform just the same operation as that in FIG. 8B, but also make a schedule so that a non-communication section generated by an activation-process-starting annunciation signal is disposed at a proper location so as not to interfere with any other preferential communication. In order to realize the above, temporal information (about communication speed, allowable maximum delay, frame intervals and the like, for example) for preferential communication is stored in the storage unit 1507; the determination unit 1505 references the information to make a determination; a proper value is then specified when an instruction is issued to the annunciation signal generation unit 1508. In this case, the frame intervals are intervals at which high-priority communication signals are transmitted. In the diagram, the frame intervals are intervals at which high-priority communication signals 1903 are transmitted. The maximum delay is a maximum extension period from a frame interval in the case where a signal 1903 is transmitted after a longer interval is given than a predetermined frame interval 1903. Incidentally, the temporal information stored in the storage unit 1507 maybe stored together with the priority information shown in FIG. 16 or 17. It is possible to transmit a remote activation signal in a way that avoids high-priority communication, which is recognized in advance. Therefore, it is possible to realize remote activation in a more stable manner while minimizing the effects on the high-priority communication. For example, in FIG. 19, the non-communication section 1904 set up by an annunciation signal is set to any section other than a section in which a high-priority signal 1903 is transmitted. For example, the annunciation signal generation unit 1508 uses a frame interval as temporal information to set up the non-communication section 1904. As shown in FIG. 19, if the repeater device 1500 transmits high-priority signals 1903 at regular intervals, the intervals are stored in the storage unit 1507. The annunciation signal generation unit 1508 references the intervals stored in the storage unit 1507 to set up the non-communication section 1904 in a portion that does not collide with a high-priority signal 1903. Moreover, the annunciation signal generation unit 1508 uses a frame interval and an allowable maximum delay as temporal information to set up the non-communication section 1904, which is set up by an annunciation signal. The annunciation signal generation unit 1508 sets up the non-communication section 1904 in a section of the sum of the frame interval and the maximum delay.

If the frame is a frame that should be preferentially processed (Step S2002-NO), a process of generating and transmitting an activation signal involving the above NAV is performed. Moreover, a similar level of priority is given to the activation signal. For example, suppose that a series of operational flows is being executed after frames corresponding to the rows 1611 and 1613 of FIG. 16 are received. In this case, since being categorized as high-priority, a method that uses an activation signal involving the NAV is selected, and a high level of priority is also given to a generated activation signal.

First, an activation signal involving the NAV is generated, and is stored in the frame storage unit 104 (Step S2003). The determination unit 1505 gives the transmission processing unit 103 an instruction to transmit an activation signal frame (which is, however, at the same level of priority as a frame that triggers the present process) as in the case of other frames. The transmission processing unit 103 reads the activation signal frame (Step S2004), and transmits the activation signal frame to the network at a proper timing for which the priority is taken into account (Step S2005). After that, the activation signal frame is removed from the frame storage unit 104 (Step S2006).

After the transmission of the activation signal frame is completed, the state of the communication device, which is managed in the storage unit 107, is changed to "Operation in progress" (Step S2007). Then, in order to prevent frames from being lost, after a certain period of time has passed, the transmission of a frame buffered in the frame storage unit 104 starts (Step S2008).

In the embodiment of FIG. 19, the frame 1907 represents high-priority communication toward a resting communication device. The frame 1908 is a corresponding activation signal frame. With the use of the NAV, it is unnecessary to wait until a non-communication section is set up by an annunciation signal. Therefore, it is possible to transmit an activation signal at high speed.

In a series of operations, if the received frame is not equivalent to management data of such priority information, it may be assumed that no priority information has been set.

An advantage of the activation signal generation/transmission method, which is added in the present third embodiment, is that it is possible to transmit an activation signal frame at speeds faster than the form of first embodiment.

Incidentally, a QoS ensuring method in wireless communication complies with the method of a network to which the repeater device 1500 is connected. For example, if the network is a wireless LAN that uses IEEE802.11, it is possible to realize by changing transmission intervals and back-off time or performing other operations. That is, all that is required is to make it possible to obtain a transmission right with shorter transmission intervals and back-off time as the priority of communication becomes higher.

Moreover, as for the operations (FIGS. 9A to 9C) triggered by the time of first embodiment, even the repeater device 1500 is similarly equipped.

As described above, according to the repeater device 1400 of the present example, when the received frame is preferentially processed, activation is achieved with the use of the NAV. Therefore, it is possible to transmit an activation signal to a communication device at high speed and without fail. When a non-communication section is set up for a low-priority frame, a period is so set as not to interfere with communication of a high-priority frame. Therefore, it is possible to transmit a high-priority frame at high speed to a communication device, which is destination of the high-priority frame. As a result, it is possible to stick to a priority control policy of the system as a whole.

[Fourth Embodiment]

A communication device of fourth embodiment represents an embodiment in which the features of the repeater devices of first to third embodiments are applied to a communication device that does not have a function of managing the network.

The repeater devices of first to third embodiments (which are, for example, access points in infrastructure mode of IEEE802.11) have been devices that have a function of managing the network. In contrast, a communication device of fourth embodiment does not have a function of managing the network. For example, a communication device of fourth embodiment is a communication device that makes up an ad-hoc network. A communication device of fourth embodiment is a communication device that supports an ad-hock network mode. It is possible to apply the configurations and operations of the repeater devices of first to third embodiments without making changes thereto.

Figure 21:
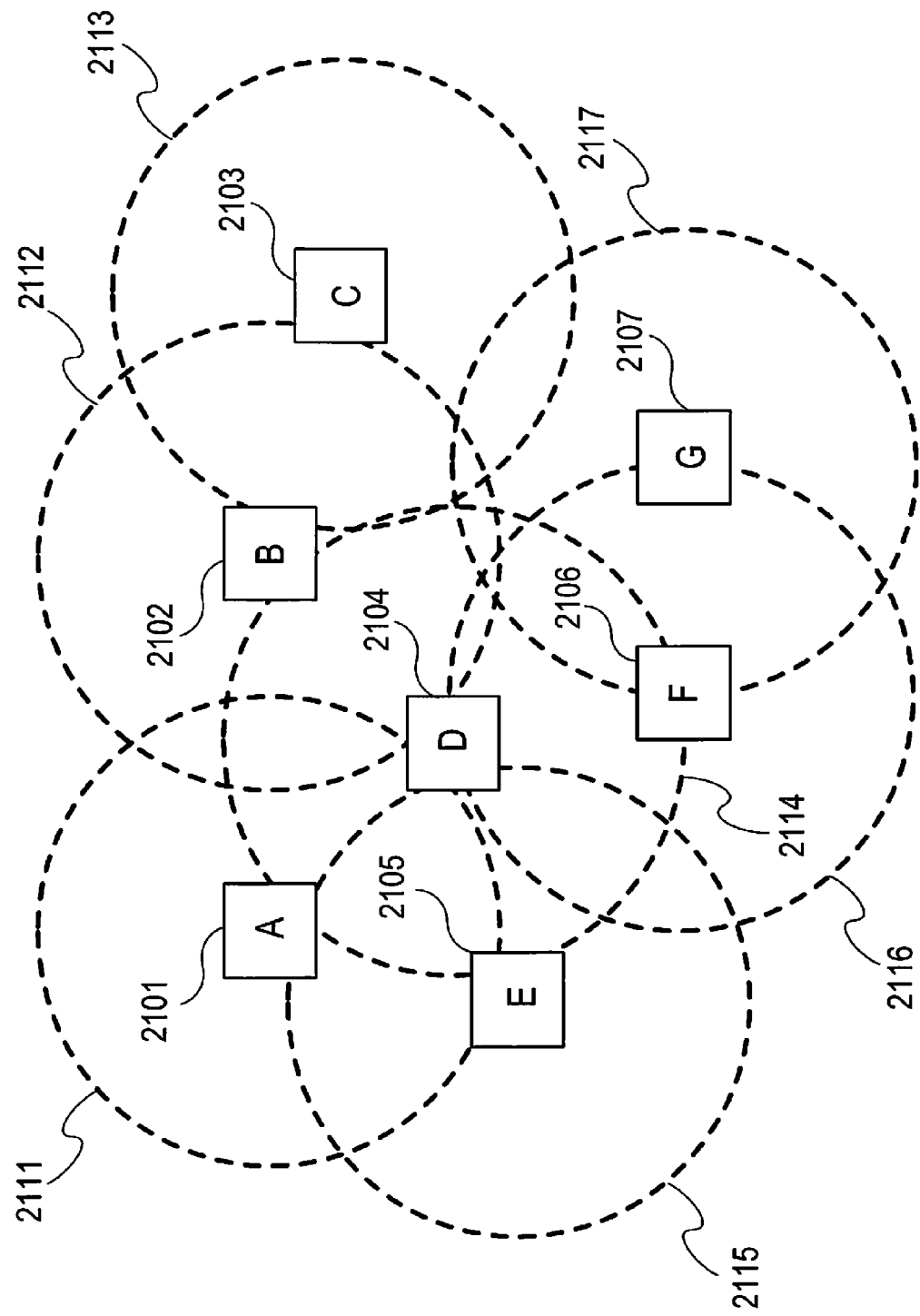
FIG. 21 is a diagram illustrating communication devices making up an ad-hoc network and radio coverage.

An operation of communication devices of fourth embodiment will be described. FIG. 21 shows an ad-hoc network containing seven communication devices (2101 to 2107). Suppose that the radio coverage of each communication device is a portion (2111 to 2117) indicated by dotted line in the diagram. Suppose that the communication devices know the most appropriate routes to each communication device using an ad-hoc routing protocol.

The following describes the case where a communication device A2101 transmits a packet (data frame) to a communication device F2106. To transmit a packet from the communication device A2101 to the communication device F2106, there are two routes, (A→E→W→F) and (A→D→F). In fourth embodiment, the case where the packet goes through route (A→D→F) will be described.

First, in the ad-hoc network, the case where both a communication device D2104 and the communication device F2106 are in operation will be described. The communication device A generates a packet whose destination address is the communication device F2106, and transmits the packet to the communication device D2104. After determining that the received packet is addressed to the communication device F2106 adjacent to the communication device D2104, the communication device D2104 transfers the packet to the communication device F2106. In this manner, the packet reaches the desired communication device.

The following describes the case where the communication device F2106 has stopped. In this case, it is necessary for the communication device D2104 adjacent to the communication device F2106 to transmit an activation signal to the communication device F2106 to activate the communication device F2106, thereby bringing the communication device F2106 back to the network. The communication device D2104 performs the same operation as that of the repeater device 100 of first embodiment.

An operation and configuration of the communication device D2104 will be described in concrete terms. The communication device D2104 continuously manages the operating states of adjacent communication devices. For example, the communication device D2104 manages the information shown in FIG. 5. Incidentally, what is shown in FIG. 5 is information managed by an access point in infrastructure mode. However, even in ad-hoc mode, similar information is retained by each communication device.

A series of operations that starts with the receiving of a packet from the communication device A2101 and ends with the transmission of an activation signal is similar to the operations shown in FIG. 2. In FIG. 2, the repeater device 100 is replaced with the communication device D2104, another communication device 202 with the communication device A2101, and the to-be-activated communication device 201 with the communication device F2106. Accordingly, the internal operation of the communication device D2104 is the same operation as that of the repeater device 100 of first embodiment. That is, after receiving a packet from the communication device A2101, the communication device D2104 transmits an annunciation signal to notify the start of an activation process. Then, in a non-communication section setup by the annunciation signal, an activation signal is transmitted to the communication device F2106. After the communication device F2106 becomes activated, the communication device D2104 transmits a packet to the communication device F2106.

Incidentally, the configuration and operation of the repeater device 1100 of second embodiment can be applied to the communication device D2104. That is, after generating an activation signal, the communication device D2104 transmits an activation confirmation frame to the communication device F2106. Therefore, it is possible to confirm the activation of the communication device F2106. After the activation is confirmed, it is possible to transfer a packet.

The configuration and operation of the repeater device 1500 of third embodiment can be applied to the communication device D2104. That is, the communication device D2104 activates the communication device F2106 on the basis of the priority, which is attached to a packet received from the communication device A2101.

In the above description, the activation of a communication device in the case where a packet-destination communication device has stopped is used as an embodiment for description. The above can be also applied to the case where a communication device on the route has stopped.

According to fourth embodiment, in the ad-hoc network, an adjacent communication device activates a communication device not in operation after setting up a non-communication section. Therefore, it is possible to activate a communication device without fail. Since the communication device becomes activated, it is possible to transmit a data frame to the communication device without fail.

[Fifth Embodiment]

A repeater device 2200 of fifth embodiment is a repeater device in which the communication interface 101 carries out any communication other than that of an activation signal, and an activation-dedicated communication interface 2201 carries out the transmission of the activation signal.

Figure 22:
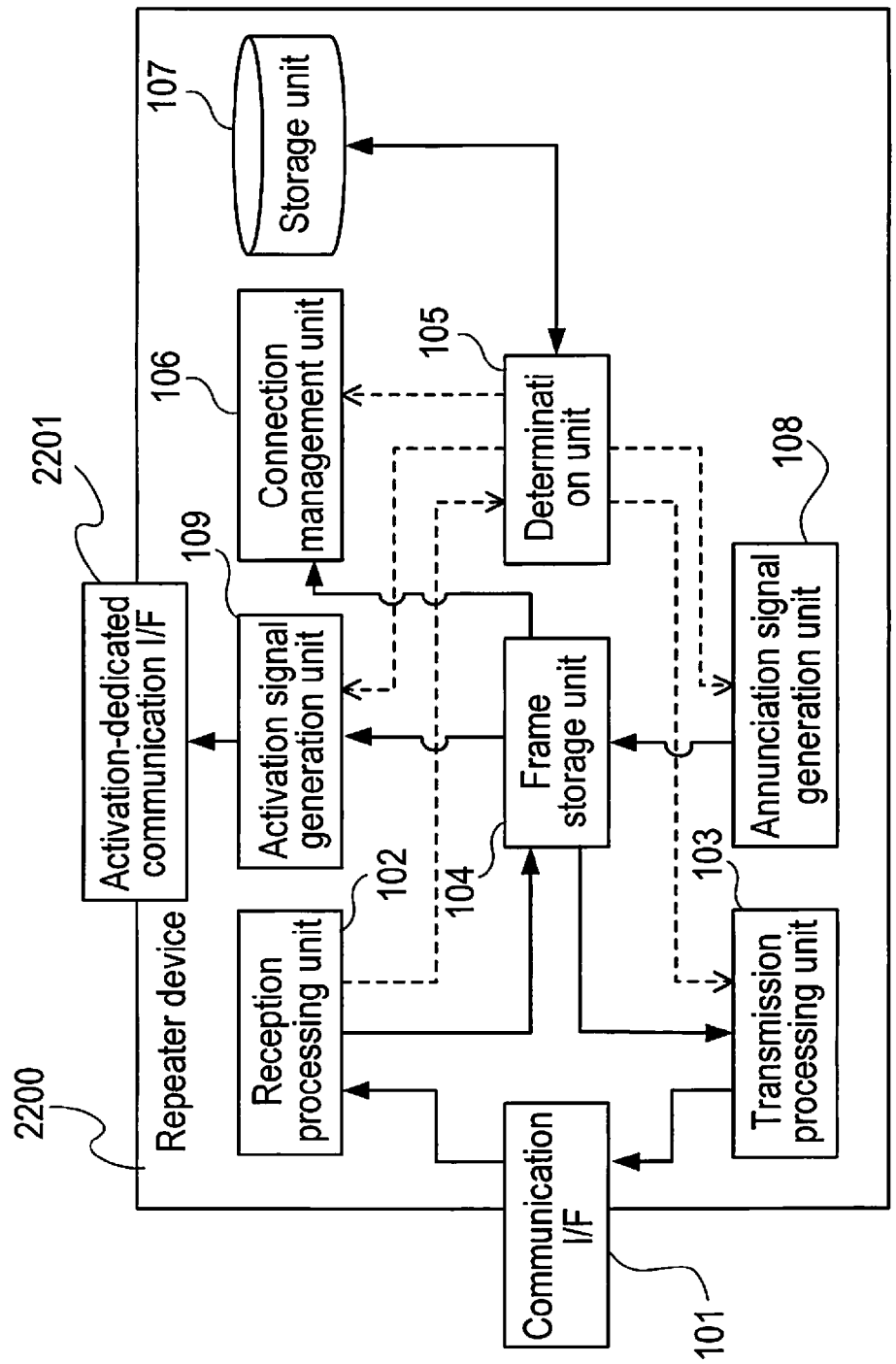
FIG. 22 is a block diagram showing the configuration of a repeater device according to fifth embodiment.

As for the repeater devices of first to third embodiments, an embodiment in which one communication interface carries out any communication other than that of an activation signal and the transmission of the activation signal has been described. As shown in FIG. 22, in the repeater device 2200 of fifth embodiment, the communication interface 101 carries out any communication other than that of an activation signal, and an activation-dedicated communication interface 2201 carries out the transmission of the activation signal. For example, the communication interface 101 uses IEEE802.11. The activation-dedicated communication interface 2201 uses the same frequency band as that of IEEE802.11 or overlapping frequency bands, and is designed to transmit a radio wave specific to the activation signal.

According to the repeater device 2200 of the present embodiment, when an activation signal that is to be transmitted via the activation-dedicated communication interface 2201 is transmitted, it is possible to stop the communication interface 101 from transmitting and receiving a wireless frame. As a result, it is possible to prevent the interference caused by a wireless frame at a time when an activation signal is transmitted, as well as to achieve remote activation in a more reliable manner.

The following describes differences in terms of the operation of the repeater device 2200 of the present embodiment. In the repeater device 2200, an activation signal is transmitted by the activation-dedicated communication I/F 2201. Moreover, the repeater device 2200 stores an activation signal frame, which is generated at step S210 of FIG. 8B, in the activation signal generation unit 109, not in the frame storage unit 104. Moreover, at step S314 of FIG. 9C, an activation signal frame is not read from the frame storage unit 104, but is processed inside the activation signal generation unit 109. Other operations of the repeater device 2200 are the same as those of the repeater device 100 of first embodiment.

According to the repeater device of fifth embodiment, an activation signal frame is transmitted to a communication device in a non-communication section. Therefore, it is possible to transmit the activation signal frame to the communication device without fail. As a result, it is possible to remotely activate the communication device without fail. Moreover, according to the repeater device of fifth embodiment, an interface for transmitting an activation signal and an interface for data communication are provided separately. Therefore, it is possible to stop data communication when an activation signal is transmitted. Therefore, without being affected by data communication, it is possible to transmit the activation signal frame to the communication device. As a result, it is possible to activate the communication device in a more reliable manner.

While certain embodiments have been described, these embodiments have been presented by way of example only, and are not intended to limit the scope of the inventions. Indeed, the novel methods and systems described herein maybe embodied in a variety of the other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A repeater device, comprising:
an interface that connects to a network, receives a data frame, transmits an activation signal frame, and transmits an annunciation signal frame;
an activation signal generation unit that generates an activation signal frame, which activates a first communication device connected to the network, when a data frame, which is to be transmitted to the first communication device, is received and when the first communication device is not in operation;
an annunciation signal generation unit that generates an annunciation signal frame, which sets up a non-communication period in which no frame is transmitted for a certain period of time by communication devices that receive the annunciation signal frame;
a frame storage unit that stores the data frame, the activation signal frame and the annunciation signal frame; and
a confirmation signal generation unit that generates a confirmation frame that confirms whether the first communication device becomes activated, wherein
the annunciation signal frame is transmitted to communication devices connected to the network via the interface, and, with the non-communication period setup, the activation signal frame is transmitted to the first communication device,
the frame storage unit stores the data frame that is to be transmitted to the first communication device being activated by the activation signal frame for a longer period of time than a data frame that is to be transmitted to a communication device that is connected to the network and not being activated, and
the confirmation frame is transmitted after the activation signal frame is transmitted to the first communication device via the interface, and, after a response signal to the confirmation frame is received, the data frame is transmitted to the first communication device.

2. The repeater device according to claim 1, further comprising a determination unit that determines, when a data frame that is to be transmitted to a communication device connected to the network is received, priority as to the transmission of a data frame for each of the communication devices, wherein:

when it is determined that the priority as to the transmission of another data frame to the first communication device is high, the activation signal generation unit generates a high-priority activation signal frame comprising an activation signal frame and an annunciation signal frame, which sets up a non-communication period in which no frame is transmitted for a certain period of time by communication devices that receive the high-priority activation signal frame; and the high-priority activation signal frame is transmitted via the interface.

3. The repeater device according to claim 2, further comprising a storage unit that stores temporal information, which includes transmission intervals at which the high-priority data frame is transmitted among data frames transmitted to communication devices connected to the network, wherein when the determination unit determines that the other data frame that is to be transmitted to the first communication device is of low priority, the annunciation signal generation unit generates, on the basis of the temporal information, a low-priority annunciation signal frame that sets up a non-communication period except a period in which, among data frames to be transmitted to communication devices connected to the network, a high-priority data frame is transmitted.

4. The repeater device according to claim 3, further comprising a second interface that transmits the activation signal frame.

* * * * *